United States Patent
Ishizaki et al.

(10) Patent No.: US 6,781,926 B2
(45) Date of Patent: Aug. 24, 2004

(54) MAGNETO-OPTICAL HEAD HAVING HEAT SINK LAYER

(75) Inventors: Osamu Ishizaki, Makabe-gun (JP); Katsusuke Shimazaki, Toride (JP); Hiroyuki Awano, Noda (JP); Reiji Tamura, Kitasouma-gun (JP); Tsuyoshi Maro, Kitasouma-gun (JP); Toshinori Sugiyama, Tsukuba (JP)

(73) Assignee: Hitachi Maxell, Limited, Ibaraki (JP)

( * ) Notice: Subject to any disclaimer, the term of this patent is extended or adjusted under 35 U.S.C. 154(b) by 395 days.

(21) Appl. No.: 09/973,021

(22) Filed: Oct. 10, 2001

(65) Prior Publication Data

US 2002/0097639 A1 Jul. 25, 2002

(30) Foreign Application Priority Data

Oct. 10, 2000 (JP) .......................... 2000-308951
Oct. 19, 2000 (JP) .......................... 2000-319244
Nov. 29, 2000 (JP) .......................... 2000-362878

(51) Int. Cl.$^7$ ............................................ G11B 11/00
(52) U.S. Cl. ................................ 369/13.13; 369/13.33
(58) Field of Search ...................... 369/13.13, 13.33, 369/13.17, 13.32, 112.01, 112.08, 112.13, 112.2, 112.93, 112.26

(56) References Cited

U.S. PATENT DOCUMENTS 6,243,350 B1   6/2001   Knight et al.
6,351,436 B1 * 2/2002   Mallary ................... 369/13.17
6,560,168 B1 * 5/2003   Saga et al. ............... 369/13.01
6,618,330 B1 * 9/2003   Kawasaki et al. ........ 369/13.23
6,631,099 B1 * 10/2003  Kouchiyama ............ 369/13.33
6,704,249 B2 * 3/2004   Yoshikawa et al. ...... 369/13.23

FOREIGN PATENT DOCUMENTS

JP         11-316986 A        11/1999

OTHER PUBLICATIONS

US 2003/0026174A1, Yoshikawa et al, "Magnetic Head With Improved Heat Dissipation Properties", Feb. 14, 2002.*
US 2002/0031056A1, Penning et al, "Method Og Manufacturing A Magnetic Head Having Planar Coil", Aug. 7, 2001.*

* cited by examiner

Primary Examiner—Tan Dinh
(74) Attorney, Agent, or Firm—Oliff & Berridge, PLC

(57) ABSTRACT

A magneto-optical recording head comprises a magnetic coil formed on a lower surface of a transparent substrate opposed to a magneto-optical disk. A heat sink layer is provided at the outside of the magnetic coil on the lower surface. An objective lens is supported on an upper surface of the transparent substrate. The heat, which is generated by the magnetic coil, is released via the heat sink layer to the space between the magneto-optical disk and the substrate. The release of the heat is facilitated by the air stream which is generated by the rotation of the magneto-optical disk. The heat can be effectively released from the magnetic coil without inhibiting optical characteristics of the objective lens.

30 Claims, 26 Drawing Sheets

Fig. 5
(a)
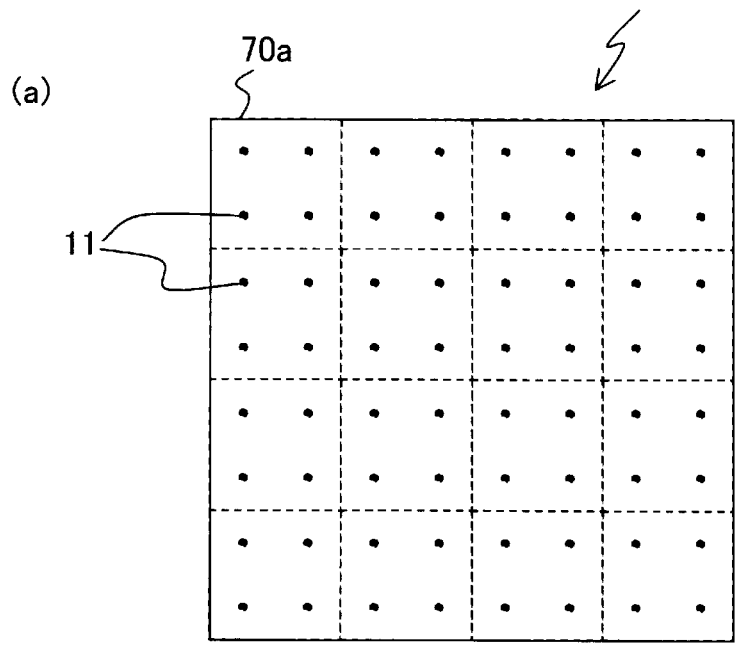
(b)
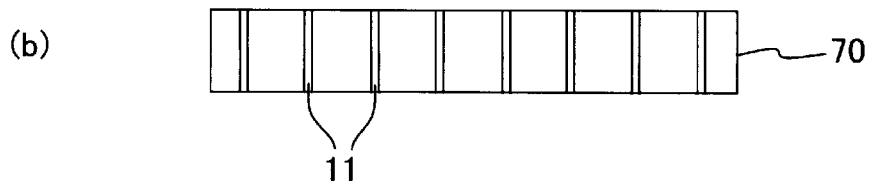
(c)
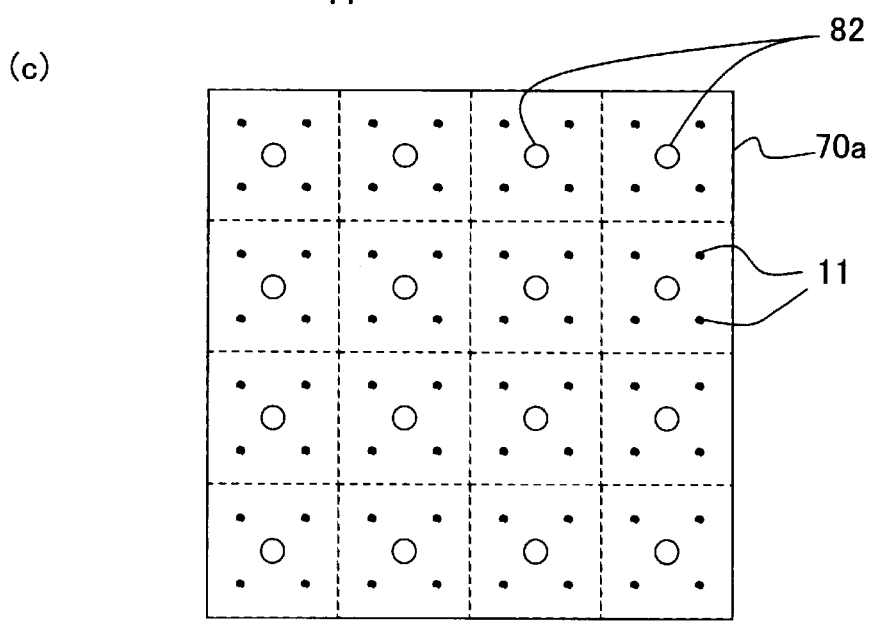

Fig. 7
(e)
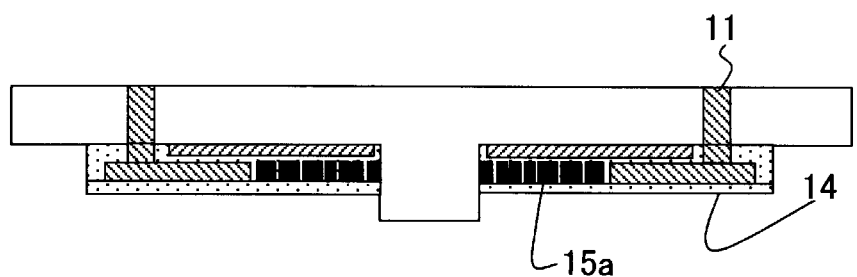
(f)
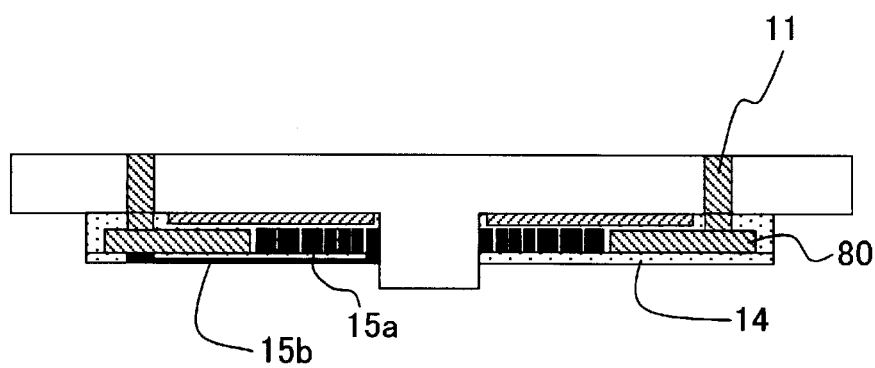
(g)
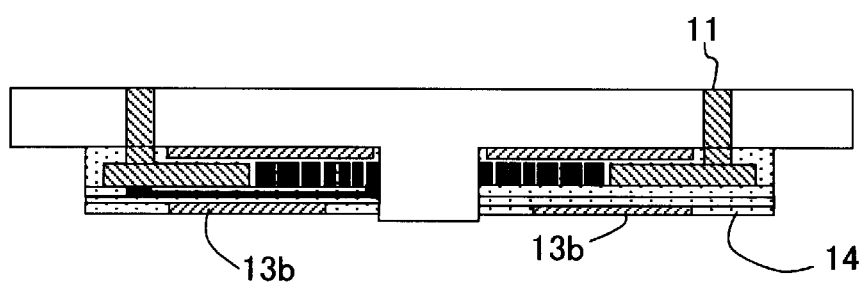
(h)
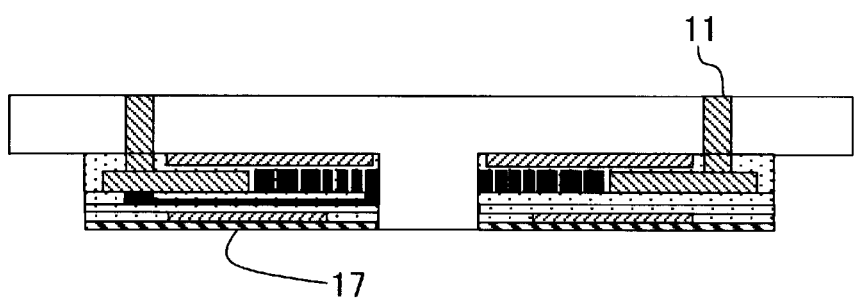

MAGNETO-OPTICAL HEAD HAVING HEAT SINK LAYER

BACKGROUND OF THE INVENTION

1. Field of the Invention

The present invention relates to a magneto-optical recording apparatus for recording information on a magneto-optical recording medium with an objective lens having high NA. The present invention also relates to a magneto-optical head to be used for the magneto-optical recording apparatus.

2. Related Art

In recent years, in response to the advance of multimedia, the optical recording medium has been used, on which a large amount of data can be recorded at a high density, and recording and reproduction can be performed at a high speed. Such an optical recording medium includes read-only media such as compact disks on which information is previously recorded as pits on the disk during formation of the disk, write-once media such as CD-R on which recording can be performed only once, and rewritable media on which data can be rewritten any number of times by the magneto-optical recording system or the phase-change recording system.

Among the optical recording media as described above, a magneto-optical recording medium is principally used in a field in which a high transfer rate is required. When the magneto-optical recording medium is subjected to recording and reproduction, a laser beam is converged with a lens up to the diffraction limit so that the magneto-optical recording medium is irradiated therewith. The light spot, which is formed on the magneto-optical recording medium as a result of the irradiation with the laser beam, has a size of about $\lambda/NA$ provided that $\lambda$ represents the wavelength of the laser beam and NA represents the numerical aperture of the lens.

In order to record or reproduce a pattern having a higher density, i.e., having a smaller size, it is necessary to use a smaller laser beam spot. In order to decrease the size of the light spot, it is conceived that the wavelength ($\lambda$) of the laser beam is decreased or the numerical aperture (NA) of the lens is increased according to the expression described above. The numerical aperture (NA) of the lens is represented by $NA=\sin\theta$ provided that $\theta$ represents the focusing half angle of the lens, and numerical aperture (NA) of the lens has a value smaller than 1. The objective lens, which is used in an optical recording apparatus commercially available at present, has NA of about 0.6 at most. The reason why the value of NA is restricted to be about 0.6 is as follows. That is, if the NA is increased, the astigmatism and the aberration generated when the optical axis of the objective lens is inclined with respect to the disk surface are increased. In order to solve this problem, it is necessary to thin the thickness of the transparent substrate of the disk through which the light beam is transmitted before arrival at the magneto-optical recording layer of the magneto-optical recording medium. However, if the thickness of the substrate is made thin, then the surface fluctuation of the disk is increased due to the decrease in rigidity of the substrate, and the substrate is inclined with respect to the optical axis of the objective lens. For this reason, the aberration as described above is generated.

In view of the above, it is conceived that the light beam is allowed to come into the disk from the side opposite to the substrate of the disk, i.e., from the side of the film surface, when the disk is irradiated with the light beam. Even if the film surface incidence system is adopted as described above, various problems still remain when the objective lens having high NA is used.

For example, a magneto-optical head, in which an optical system and a magnetic coil are integrated into one unit, is known to be used in a magneto-optical recording apparatus. Such a magneto-optical head is effective when information is recorded in the magneto-optical recording layer by using a lens having high NA. However, the magnetic characteristics are deteriorated especially when the recording is performed by applying a modulated magnetic field having a high frequency, because the magnetic coil is heated by the radiated light beam. Japanese Patent Application Laid-Open No. 11-316986 discloses an optical head which is provided with a thermal conduction film between a coil and a coil support member. This patent document discloses the following technique. That is, the thermal conduction film has a coefficient of thermal conductivity which is not less than at least several times a coefficient of thermal conductivity of the coil support member. Therefore, the heat, which is generated in the coil, can be efficiently conducted to an objective lens via the thermal conduction film to suppress the increase of temperature of the coil. However, if the heat is conducted to the objective lens, a problem arises such that the optical characteristics of the lens are deteriorated due to the thermal expansion of the lens.

Usually, the magneto-optical head includes two types of lenses which are provided in combination to be used as an objective lens system. When the lenses each having high NA are used for the objective lenses, the wave front aberration readily tends to appear due to any discrepancy between the optical axes of the lenses. The wave front aberration as described above decreases the reproduced signal characteristics. Therefore, it is necessary that the optical axes of the two types of the lenses of the objective lens system are mutually adjusted highly accurately.

SUMMARY OF THE INVENTION

The present invention has been made in order to solve the problems involved in the conventional technique as described above, a first object of which is to provide a magneto-optical head and a magneto-optical recording apparatus based on the use of the magneto-optical head which makes it possible to effectively release heat from a coil without deteriorating the optical characteristics of an objective lens.

A second object of the present invention is to provide a magneto-optical head and a magneto-optical recording apparatus based on the use of the magneto-optical head which makes it possible to effectively avoid any occurrence of aberration by highly accurately adjusting optical axes of two lenses which construct an objective lens system of the magneto-optical head.

According to a first aspect of the present invention, there is provided a magneto-optical head to be used for recording information on an information-recording medium, comprising:

a lens which collects a light beam onto the information-recording medium;

a substrate which has a first surface and a second surface parallel to one another and which supports the lens on the first surface;

a magnetic coil which is provided on the second surface of the substrate; and a heat-releasing member which is provided on the second surface of the substrate and which releases heat generated by the magnetic coil.

In the magneto-optical head according to the present invention, the heat-releasing member is provided on the second surface. Accordingly, even when the magnetic coil is heated by the radiation of the light beam, the heat is not released to the first surface side of the substrate on which the lens is provided. Therefore, it is possible to avoid the thermal expansion of the lens, especially of the objective lens having high NA of $0.6 \leq NA$, and it is possible to appropriately maintain the optical characteristics of the lens. On the other hand, the heat-releasing member, which is provided on the second surface, makes it possible to release the heat generated by the magnetic coil and the vicinity thereof, to the space between the magneto-optical head and the information-recording medium. Especially, the information-recording medium usually makes the rotating movement at a linear velocity of not less than 1 m/s with respect to the magneto-optical head. Therefore, the heat-releasing member is efficiently cooled by the air stream which is generated by the rotating movement.

In the present invention, it is desirable that the heat-releasing member is provided at a position which is nearer to the information-recording medium as compared with the magnetic coil in an optical axis direction of the lens. Especially, when the heat-releasing member is exposed on the magneto-optical head so that the heat-releasing member is opposed to the information-recording medium, the heat-releasing member is cooled more effectively by the air stream which is generated by the rotating movement of the information-recording medium. Alternatively, the heat-releasing member may be provided at the outside of the magnetic coil.

In the present invention, the substrate may be a glass flat plate. When the glass flat plate, in which the first surface and the second surface are parallel to one another, is used, if the light-outgoing plane of the objective lens is flat, then it is easy to arrange the glass substrate correctly perpendicularly to the optical axis of the lens. Accordingly, it is easy to adjust the optical path for the light beam after passing through the glass flat plate.

In order to obtain an appropriate light beam by using the magneto-optical head, it is necessary to control the thickness of an adhesive layer to be constant, when the lens is bonded to the support substrate. When a support pad, which serves as a spacer, is provided between the lens and the support substrate, it is possible to control the thickness of the adhesive layer to be constant. Accordingly, it is easy to arrange the support substrate correctly perpendicularly with respect to the optical axis of the lens. Thus, it is possible to obtain an appropriate light beam on the magneto-optical disk. It is preferable that the support pad is composed of metal, for the following reason. That is, when the support pad is made of metal, the support pad can be simultaneously formed in the step of plating the terminal of the coil. When the pad is bonded by an adhesive, the portion (light-transmitting section), which is disposed between the disk substrate surface (second surface) and the end surface on the light-outgoing side of the lens, may be filled with the adhesive. In this arrangement, it is desirable for the adhesive to select one having a refractive index which is approximate to refractive indexes of the lens and the substrate. When the gap is formed without filling the portion with the adhesive, a reflection-preventive film may be formed on the end surface on the light-outgoing side of the lens and the first surface of the substrate, in order to avoid any interface reflection of the light beam, which would be otherwise caused between the glass and the gap.

A projection or a protective pad may be provided on the second surface of the substrate. Even when any dust adheres to the disk, the projection or the protective pad protects the magnetic coil and the light-transmitting section provided at the center of the magnetic coil. It is possible to provide the magneto-optical head having high durability. The protective pad may be formed of a variety of resin materials.

When the surface of the projection is formed with a protective film such as those composed of, for example, silicon oxide, silicon nitride, zirconia, and diamond-like carbon, it is possible to provide the magneto-optical head having more excellent durability.

In the magneto-optical head according to the present invention, it is desirable that the support substrate has an areal size which is larger than that of the lens in a direction along a surface of the substrate. When such an arrangement is adopted, the terminal of the coil can be led from the first surface of the substrate. The terminal of the coil does not protrude from the second surface of the substrate which is disposed closely to the disk surface. The coil may be stacked in two or more layers in the optical axis direction. In order to stack the coil in two or more layers, for example, the following procedure may be adopted. That is, a helical coil is formed from the outer side to the inner side on an identical surface (layer) (formation of first layer), and then the inner circumferential end is bent upwardly (or downwardly) in the optical axis direction to allow the coil to extend. Further, the coil is bent in the outer circumferential direction to allow the coil to extend in a helical form (formation of second layer). The outer i.e., at the center of the light spot on the disk. On the contrary, when A is larger than B, it is possible to intensify the magnetic field up to the central position of the coil. However, if A is extremely larger than B, the effect as described above is reduced. Therefore, it is especially preferable to satisfy $1.2 \leq A/B \leq 3.2$.

The soft magnetic layer preferably has an oblong configuration to cover the coil, for the following reason. That is, it is intended to facilitate the control of the magnetic permeability of the soft magnetic layer formed on the disk surface or the opposite surface of the coil. Alternatively, an equivalent effect is, also obtained by dividing the soft magnetic layer into a plurality of individuals to form a strip-shaped configuration.

According to a second aspect of the present invention, there is provided a magneto-optical recording apparatus for recording information on an information-recording medium, comprising:

a light source;

a magneto-optical head with which a light beam from the light source is radiated onto the information-recording medium to record the information; and a detecting system which detects the light beam returning from the information-recording medium, wherein the magneto-optical head comprises:

a lens which collects the light beam onto the circumferential end of the second layer of the coil can be led to the first surface of the substrate via a through-hole previously formed through the substrate.

A first soft magnetic layer, which is formed with an aperture for transmitting the light beam, may be provided between the coil and the second surface of the substrate. The soft magnetic layer may be formed over a substantially entire surface of the support substrate except for the light-transmitting section which is disposed at the center of the coil. When the soft magnetic layer is provided, the heat, which is generated by the coil, is easily diffused via the soft magnetic layer. The soft magnetic layer also plays a role to increase the magnetic field which is generated by the coil. Further, in addition to the first soft magnetic layer, a second soft magnetic layer, which is formed with an aperture for transmitting the light beam, may be further provided on a side of the disk of the coil.

When the first and second soft magnetic layers are provided, it is preferable that A is larger than B provided that A represents an areal size of the aperture of the second soft magnetic layer for transmitting the light beam and B represents an areal size of the aperture of the first soft magnetic layer for transmitting the light beam. If A and B are substantially equal to one another, the magnetic field is increased in the vicinity of the coil. The magnetic field is not increased so much at the central position of the coil, information-recording medium;

a substrate which has a first surface and a second surface parallel to one another and which supports the lens on the first surface;

a magnetic coil which is provided on the second surface of the substrate; and a heat-releasing member which is provided on the second surface of the substrate and which releases heat generated by the magnetic coil.

It is desirable that the magneto-optical recording apparatus according to the present invention is provided with a two-dimensional actuator which simultaneously performs focus servo and tracking servo. In this arrangement, it is preferable that the two-dimensional actuator is installed with the substrate provided with the magnetic coil. When this structure is adopted, the magnetic field can be stably applied to the recording film on which the light beam is collected, even when the light-collecting position of the light beam is changed by moving the lens while following the eccentric movement and the surface fluctuation of the disk. The numerical aperture (NA) of the lens may be 0.7 to 0.95. In order to perform the super high density recording, a solid immersion lens having NA of not less than 1 may be used.

The magneto-optical head described above may be installed on a floating (flying) slider to provide a floating type head. In this case, a groove for the floating action may be formed on the surface of the slider.

Those usable as the information-recording medium include a magneto-optical recording medium in which at least a reflective film, a recording layer, and a transparent dielectric layer are stacked in this order on a substrate provided with lands or grooves, for example, in order to perform the groove recording or the land recording with a track pitch of not more than 0.9 μm. In this specification, it is intended that the term "magneto-optical recording apparatus" refers to an apparatus which has not only the recording function but also the reproducing function.

According to a third aspect of the present invention, there is provided a magneto-optical head to be used for recording information on an information-recording medium, comprising:

a first lens and a second lens which have a common optical axis to collect a light beam onto the information-recording medium;

a first lens holder which holds the first lens;

a second lens holder which holds the second lens;

a first actuator which is provided between the first lens holder and the second lens holder and which relatively moves the first lens holder with respect to the second lens holder in a direction perpendicular to the optical axis of the first lens;

a substrate which has a first surface and a second surface, and which supports the first lens holder and the second lens holder on the first surface; and a magnetic coil which is provided on the second surface of the substrate.

In the magneto-optical head described above, the optical axes of the first lens and the second lens can be correctly adjusted by relatively moving the first lens holder with respect to the second lens holder by using the first actuator. Therefore, it is possible to avoid any occurrence of the wave front aberration even when a lens having high NA is used for the second lens. The discrepancy between the optical axes of the first lens and the second lens can be detected by detecting a reproduced signal from the information-recording medium while relatively moving the first lens holder with respect to the second lens holder by the first actuator.

When the magneto-optical head is a head of the pickup type, it is preferable that the magneto-optical head further comprises a second actuator which relatively moves the first lens holder with respect to the second lens holder in a direction of the optical axis.

A protective pad may be provided on the second surface of the substrate. In this arrangement, it is preferable that the protective pad covers at least four corners of the second surface of the substrate. The protective pad may cover the whole of the outer circumferential portion of the second surface of the substrate. Alternatively, isolated pads may be provided for only the four corners. The pad may be stuck to the second surface of the substrate. Alternatively, the pad may be fitted into the substrate.

Those usable as the material for the protective pad include, for example, polyethylene, polystyrene, polypropylene, polycarbonate, polyacrylate, polymethacrylate, ABS resin, polyethylene terephthalate, polyacetal, polyarylate, nylon, polyether imide, polyether amide, phenol resin, and fluororesin such as perfluoropolyethylene.

According to a fourth aspect of the present invention, there is provided a magneto-optical recording apparatus for recording information on an information-recording medium, comprising:

a light source;

a magneto-optical head with which a light beam from the light source is radiated onto the information-recording medium to record the information; and a detecting system which detects the light beam returning from the information-recording medium, wherein the magneto-optical head comprises:

a first lens and a second lens which collect the light beam onto the information-recording medium;

a first lens holder which holds the first lens;

a second lens holder which holds the second lens;

a first actuator which is provided between the first lens holder and the second lens holder and which relatively moves the first lens holder with respect to the second lens holder in a direction perpendicular to an optical axis;

a substrate which has a first surface and a second surface, the second lens being supported on the first surface; and a magnetic coil which is provided on the second surface of the substrate. The magneto-optical recording apparatus may further comprise a second actuator which relatively moves the first lens holder with respect to the second lens holder in a direction of the optical axis.

BRIEF DESCRIPTION OF THE DRAWINGS

FIG. 5 shows a machining process for a glass substrate used to produce the magneto-optical head according to the first embodiment, wherein FIG. 5(a) shows a plan view illustrating the substrate formed with through-holes, FIG. 5(b) shows a sectional view of FIG. 5(b), and FIG. 5(c) shows a plan view in which a mask section is provided.

FIG. 7 shows process steps (e) to (h) for producing the magnetic coil substrate of the magneto-optical head according to the first embodiment.

DESCRIPTION OF THE PREFERRED EMBODIMENTS

Specified embodiments of the present invention will be explained below with reference to the drawings.

First Embodiment

Figure 1:
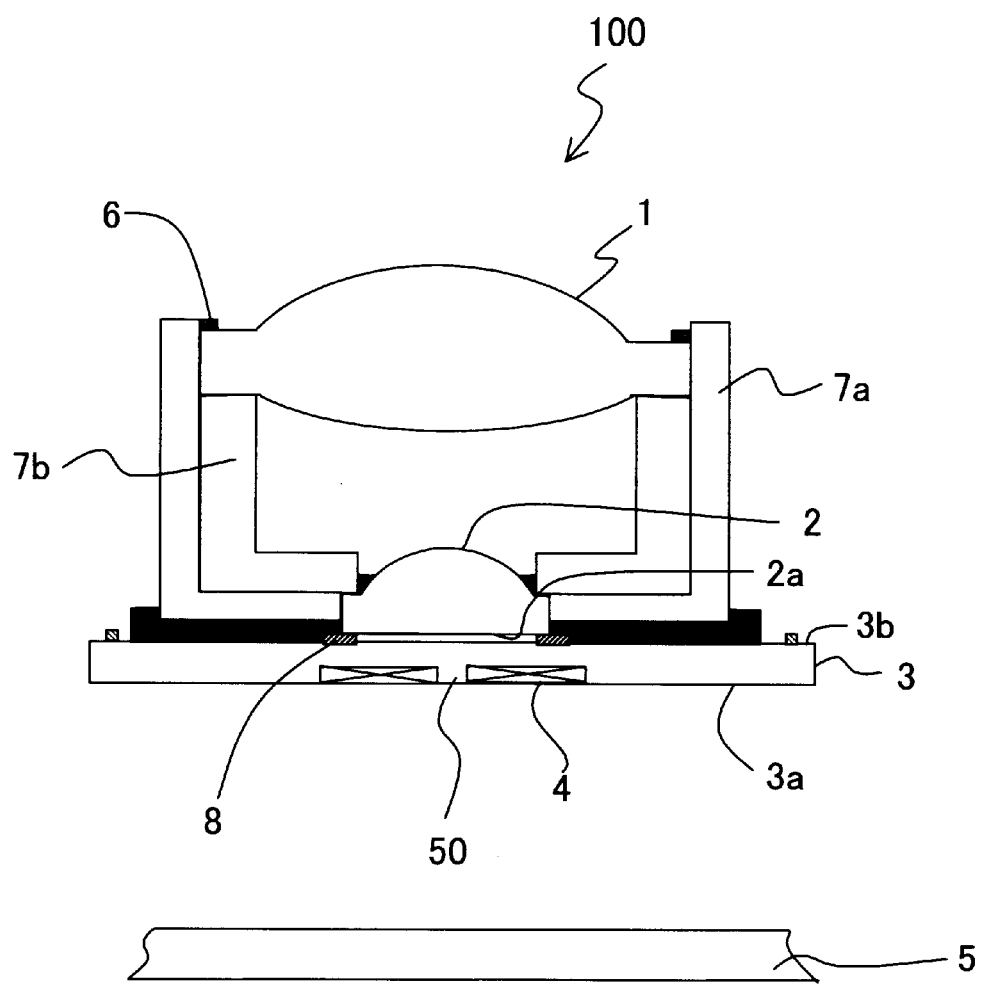
FIG. 1 schematically illustrates a structure of a magneto-optical head produced in a first embodiment.

As shown in FIG. 1, a magneto-optical head 100 according to the present invention is used to record information by applying a magnetic field while radiating a light beam onto a magneto-optical disk 5 arranged under the magneto-optical head 100. The magneto-optical head 100 comprises an objective lens system which is constructed by two combinational lenses 1, 2, a lens holder 7b which holds the lens 1, a lens holder 7a which holds the lens 2, and a coil support substrate 3 which has a magnetic coil 4.

The magnetic coil 4 is embedded in a surface 3a of the substrate 3 disposed on the side of the disk as described later on. The lens 2 is arranged by the aid of a lens support pad 8 on a surface 3b of the substrate 3 disposed on the side of the lens. A light-outgoing section of the lens 2, i.e., a surface 2a opposed to the surface 3b of the substrate 3 is a flat surface. Another surface of the lens 2 disposed on the side opposite to the surface 2a is machined to give a convex spherical surface. The lens 2 is held in an aperture which is formed through the bottom surface of the lens holder 7a (outer frame of the holder).

The lens 1 is a convex lens in which its both surfaces are convex spherical surfaces, and a flat portion is formed at its outer circumference. The flat portion of the lens is held by the upper end of the cylindrical lens holder 7b (inner frame of the holder). The lens holder 7b has the aperture at its bottom surface. The aperture allows the light beam to pass therethrough so that the light beam comes into the lens 2. The outer diameter of the lens holder 7b is substantially equal to the inner diameter of the lens holder 7a. The optical axes of the lenses 1, 2, which are held by the lens holders, are precisely subjected to positional adjustment by fitting the lens holder 7b to the lens holder 7a. NA of the objective lens system constructed by the lenses 1, 2 is 0.85.

The space between the lens holder 7a and the substrate 3 except for the light-outgoing section 2a of the lens 2 is filled with an adhesive 6. The space between the lens 2 and the aperture formed at the lower end of the lens holder 7b is also filled with the adhesive 6. Further, the flat portion of the lens 1 is fixed with the adhesive 6 to the portion of the lens holder 7a in the vicinity of the upper end thereof.

The substrate 3 is made of transparent glass. The substrate 3 is polished and machined so that the surface 3a and the surface 3b are parallel to one another with a high degree of accuracy. The substrate 3 has an areal size which is larger than an areal size of the bottom surface of the lens 2 so that the light-outgoing section 2a of the lens 2 is completely covered therewith. Although not shown in FIG. 1, an actuator, which simultaneously performs the focus servo and the tracking servo, is attached to the magneto-optical head 100 (see FIG. 22).

It is desirable that each of the lens holders 7a, 7b is constructed with a material having the same or equivalent coefficient of thermal expansion as compared with the lens material for the following reason. In the present invention, the heat, which is generated in the magnetic coil due to the electric power application to the magnetic coil or due to the irradiation with light, is suppressed for the transmission to the lens by arranging the heat-releasing member on the disk side of the substrate surface. Even in this situation, the temperatures of the lenses 1, 2 and the lens holders 7a, 7b are raised due to, for example, the heat generated by the irradiation of the lens with light beam. When the coefficient of thermal expansion of the lens holder 7a, 7b is approximately the same as that of the lens 1, 2, then it is possible to minimize the thermal stress generated in the lens 1, 2, and it is possible to avoid any deterioration of the optical characteristics of the lens. When hard glass such as BK7, which has a small coefficient of thermal expansion, is used for the material for the lens, for example, the material for the lens holder 7a, 7b is preferably copal, 42 alloy, and 41 alloy as shown in Table 1 below. On the other hand, when hard glass, for example, soda glass, which has a large coefficient of thermal expansion, is used for the lens 1, 2, for example, the material for the lens holder 7a, 7b is desirably 426 alloy, 476 alloy, and 50 alloy as shown in Table 1. The components and the coefficients of thermal expansion of the respective materials are shown in Table 1.

TABLE 1

| Name of material | Components (wt %) | Coefficient of thermal expansion ($\times 10^{-7}$/deg) |
| --- | --- | --- |
| Copal | Ni: 29, Co: 17, Fe: balance | 48, 60 |
| 42 Alloy | Ni: 42, Fe: balance | 53 |
| 41 Alloy | Ni: 40.5, Fe: balance | 50 |
| 426 Alloy | Ni: 42, Cr: 6, Fe: balance | 99 |
| 476 Alloy | Ni: 47, Cr: 6, Fe: balance | 102 |
| 50 Alloy | Ni: 50, Fe: balance | 99 |

Figure 2:
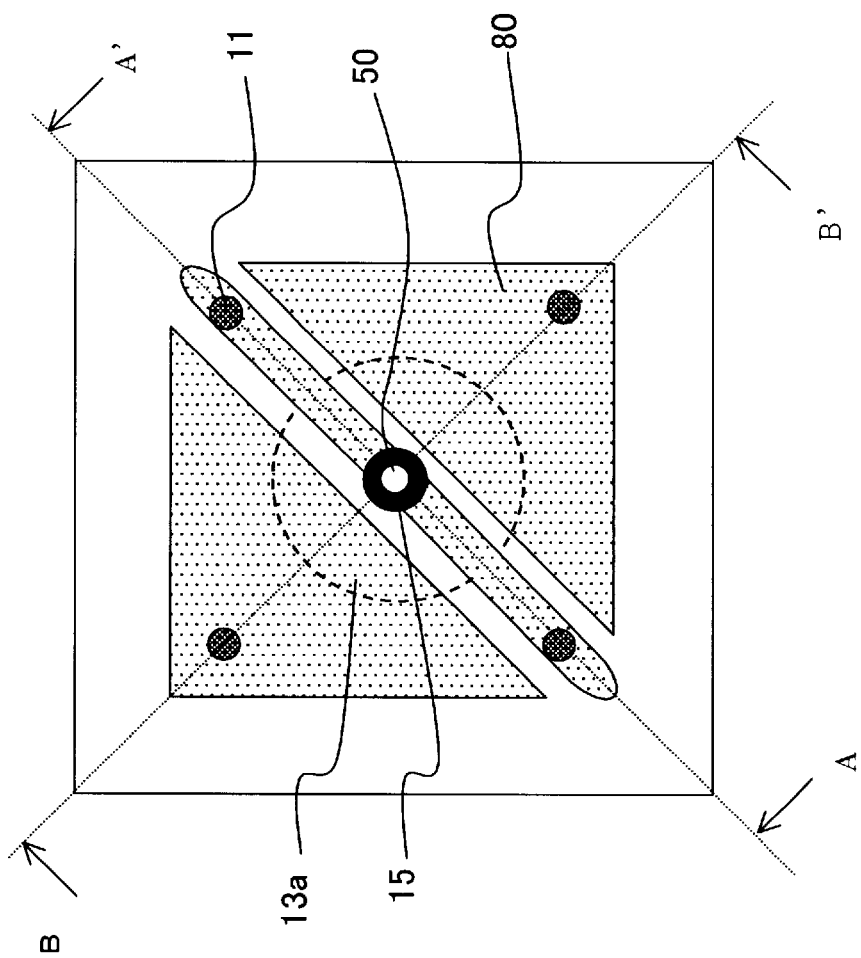
FIG. 2 schematically shows a perspective back view illustrating a magnetic coil substrate of the magneto-optical head shown in FIG. 1.
Figure 3:
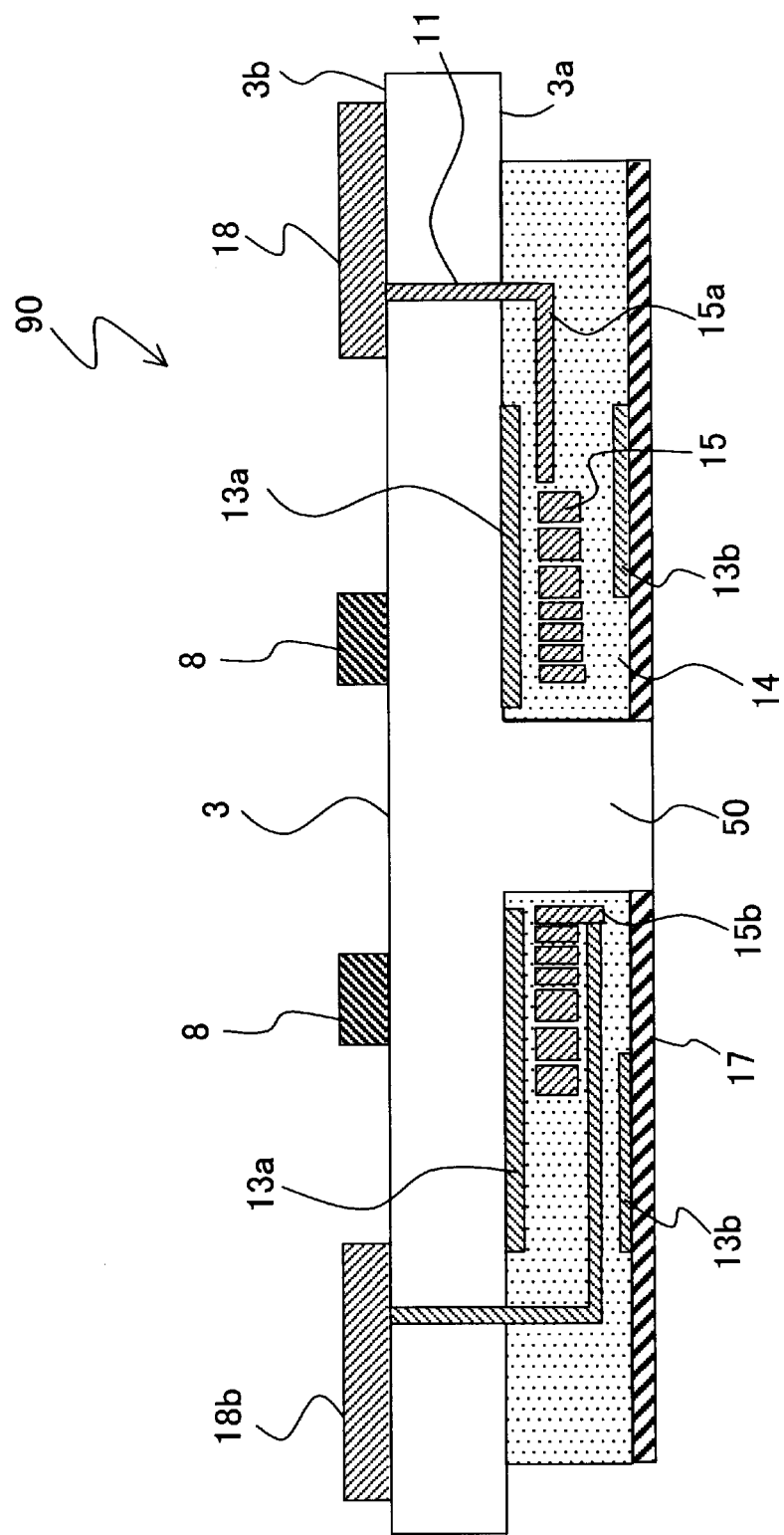
FIG. 3 shows a schematic sectional view illustrating the magnetic coil substrate cut along a plane A–A' shown in FIG. 2.
Figure 4:
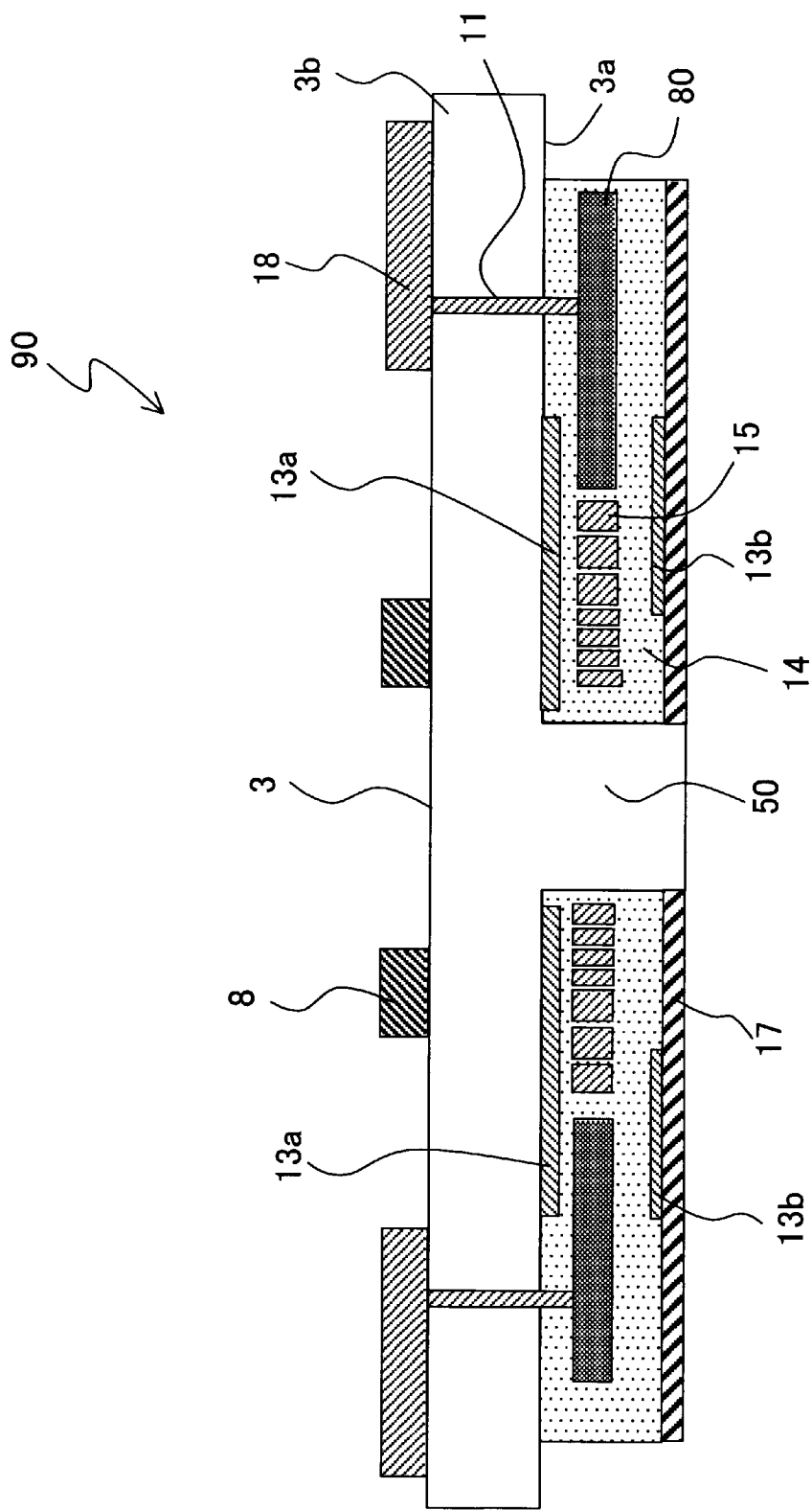
FIG. 4 shows a schematic sectional view illustrating the magnetic coil substrate cut along a plane B–B' shown in FIG. 2.

Next, explanation will be made with reference to FIGS. 2 to 4 for the bottom surface and the cross section of the substrate (hereinafter referred to as "magnetic coil substrate 90" as well) provided with the magnetic coil 4. As shown in FIG. 3 which is a cross-sectional view taken along a line A–A' shown in FIG. 2, the substrate 3 is a glass substrate having a T-shaped cross-sectional configuration. A section 50 of the substrate 3, which protrudes from the surface 3a of the substrate 3 on the disk side, functions as a light-transmitting section for directing the light beam radiated from the lens 2 toward the magneto-optical disk 5. A soft magnetic layer 13a is formed on the surface 3a of the substrate 3 on the disk side at the outside of the protruding section 50 (light-transmitting section). As shown in FIG. 2, the soft magnetic layer 13a is formed to have an annular configuration so that the soft magnetic layer 13a surrounds the protruding section 50. The soft magnetic layer 13a makes it possible to intensify the magnetic field generated by the coil and control the magnetic anisotropy. Further, the soft magnetic layer 13a facilitates the diffusion of the heat generated by the coil 4.

When the magnetic field generated by the coil is a high frequency wave, it is feared that any eddy current flows through the soft magnetic layer and the magnetic field is consequently lowered. For this reason, although not shown, the soft magnetic layer 13a has a structure in which soft magnetic layers each having a thickness of about 2 μm are stacked with insulating layers each having a thickness of several num intervening therebetween. Owing to this structure, it is possible to avoid the generation of the eddy current. In this embodiment, the soft magnetic layer is formed of permalloy, and the insulating layer is formed of silicon oxide. The soft magnetic layer and the insulating layer may be formed by means of sputtering.

A helical magnetic coil 15 is formed to circumscribe the light-transmitting section 50 with a resist 14 to function as an insulating layer intervening therebetween under the soft magnetic layer 13a. An outer circumferential end 15a of the magnetic coil 15 penetrates through a through-hole 11 formed through the substrate 3, and it is connected to a lead terminal 18b provided on the surface 3b of the substrate. An inner circumferential end 15b of the magnetic coil 15 extends downwardly, and the extending direction is inverted so that the inner circumferential end 15b is directed toward the outer circumference of the substrate 3, followed by being bent upwardly. The inner circumferential end 15b penetrates through a through-hole 11 formed through the substrate 3, and it is connected to a lead terminal 18 provided on the surface 3b of the substrate. The maximum electric power consumption of the magnetic coil is not less than 0.05 W. As understood from FIG. 4 which is a cross-sectional view taken along a line B–B' shown in FIG. 2, a heat sink layer 80 is provided at the outside of the magnetic coil 15 with a thin film of the resist 14 intervening therebetween. The heat sink layer 80 is formed to surround the magnetic coil 15 and cover the substantially entire surface of the substrate 3. The heat sink layer 80 receives the heat generated in the magnetic coil 15 to release the heat to the outside of the substrate 3, especially to the space between the disk 5 and the substrate 3. The spacing distance between the disk and the coil can be also determined by using the heat sink layer 80 such that the electrostatic capacity generated between the heat sink layer 80 and the disk is measured. The spacing distance between the disk and the coil is used to control the floating amount of the magneto-optical head over the disk. The heat sink layer 80 is connected to the lead terminal 18 formed on the upper surface 3b of the substrate 3 via a through-hole. A second soft magnetic layer 13b is further formed under the magnetic coil 15 with the resist 14 intervening therebetween. A protective layer 17 is formed at a lower end portion of the substrate so that the soft magnetic layer 13b is covered therewith. A support pad 8 for supporting the lens 2 is formed on the surface 3b of the substrate 3.

An unillustrated magnetic field-applying power source (magnetic field control unit) for supplying the current to the magnetic coil 15 is connected to the lead terminal 18. When the magneto-optical head is operated, then the light beam from an unillustrated laser light source is collected by the lenses 1, 2, and the light beam passes through the light-radiating section 50 so that the light beam is radiated onto the magneto-optical disk 5. During the irradiation with the light beam, the current having a polarity corresponding to a recording signal is allowed to flow through the magnetic coil. The magnetic field having a desired polarity is applied from the magnetic coil to the magneto-optical disk. Thus, information is recorded on the magneto-optical disk in accordance with the magnetic field modulation system.

Figure 6:
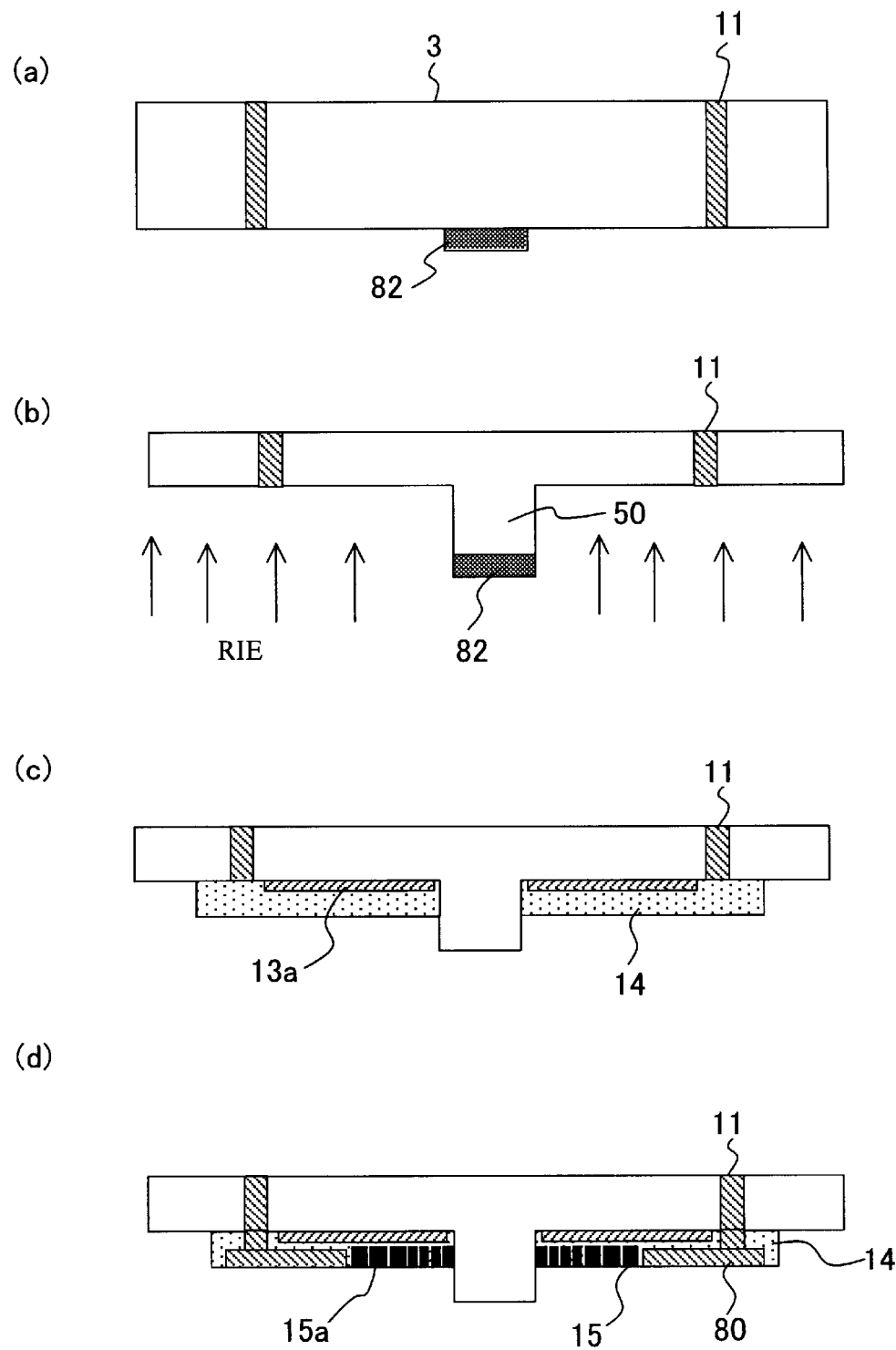
FIG. 6 shows process steps (a) to (d) for producing the magnetic coil substrate of the magneto-optical head according to the first embodiment.

Explanation will be made with reference to FIGS. 5 and 6 for the process for producing the substrate 3 provided with the magnetic coil 15 having the structure shown in FIGS. 2 to 4. At first, as shown in FIG. 5(a), a plurality of square areas 70a for forming magnetic coil substrates 90 are comparted on a transparent square glass substrate 70. The glass substrate 70 is desirably made of a material which has a uniform refractive index, which undergoes less change of the refractive index depending on the change of temperature, and which has a small coefficient of thermal expansion. BK7, which is quartz-based glass, was used for the glass substrate 70. Four through-holes 11, which penetrated through the glass substrate 70 as shown in a cross-sectional view of FIG. 5(b), were formed in each of the comparted areas 70a by using an excimer laser. The both surfaces were polished with a polishing agent so that the thickness of the substrate is uniformized highly accurately to give a thickness of 0.300 mm. After that, as shown in FIG. 5(c) and FIG. 6(a), a mask section 82 of Cr (or Ti) was formed at a portion which was located at the center of the four through-holes and which was to be converted into the light-transmitting section (50). FIG. 6(a) shows a sectional view of the substrate including the mask section 82. The process steps (a) to (h) shown in FIG. 6 illustrates the treatment for only one comparted area 70a in order to simplify the explanation. The mask section 82 may be formed by means of photolithography based on the use of a photomask. Subsequently, as shown in FIG. 6(b), etching was performed to remove a coil portion in an amount corresponding to 20 $\mu$m. Ion etching with reactive gas was used for the etching. After that, the mask section 82 was removed by performing ion etching after changing the reactive gas.

Subsequently, as shown in FIG. 6(c), a soft magnetic layer 13a composed of permalloy was formed by means of sputtering on the etching-treated surface of the glass substrate 3. During this process, the soft magnetic layer 13a was formed such that four layers of permalloy of 2 $\mu$m were stacked with silicon oxide layers (intermediate insulating layers) of 2 nm intervening therebetween (not shown). Permalloy was formed by means of sputtering. Subsequently, a resist 14 of 1 $\mu$m was applied and cured on the formed soft magnetic layer 13a.

Subsequently, the resist 14 was further applied, and the applied resist 14 was exposed to light by using a mask pattern corresponding to the coil pattern and the heat sink layer, followed by being developed to remove the resist disposed at portions to be converted into the coil 15 and the heat sink layer 80. The portion, from which the resist was removed, was filled with copper of a thickness of 5 $\mu$m by means of plating. Thus, the coil 15a of copper (coil upper layer) and the heat sink layer 80 were formed in the resist 14 as shown in FIG. 6(d). The coil had an inner diameter of 120 $\mu$m, an outer diameter of 520 $\mu$m, and a number of winding of 20.5 turns.

Further, as shown in FIG. 7(e), a resist 14 to be converted into the insulating layer was applied to cover the coil 15, and the resist 14 was smoothened. The thickness of the resist was 1 $\mu$m on the portion at which the coil was formed. Subsequently, in order to wire the end of the coil 15 via the through-hole 11, a coil extending section 15b (coil lower layer) was produced in accordance with the same treatment as the treatment shown in FIG. 6(d). The coil extending section 15b was formed as follows. That is, the coil extending section 15b extended downwardly from the inner side of the coil 15a, it is thereafter bent to extend toward the outer circumferential portion of the coil, and it was bent to be directed toward the through-hole 11 (FIG. 7(f)).

Subsequently, as shown in FIG. 7(g), a resist 14 to be converted into the insulating layer was applied, and the resist 14 was smoothened. At this stage, the thickness of the resist was 1 $\mu$m at the portion at which the coil was formed. Subsequently, a second soft magnetic layer 13b was formed. The soft magnetic layer 13b was formed such that four layers of permalloy of 2 $\mu$m were stacked with intermediate insulating layers of 2 nm intervening therebetween respectively, in the same manner as in the formation of the soft magnetic layer 13a on the glass substrate 3. The inner circumference of the soft magnetic layer 13b disposed on the disk side was larger than those of the coil 15 and the soft magnetic layer 13a disposed on the lens side. The areal size of the inner diametral portion (aperture) of the soft magnetic layer 13b was twice the areal size of the inner diametral portion of the soft magnetic layer 13a.

Subsequently, as shown in FIG. 7(h), silicon nitride of 100 nm and diamond-like carbon of 20 nm were formed in this order as a protective film 17 on the surface to which the resist 14 and the soft magnetic layer 13b were exposed.

Figure 8:
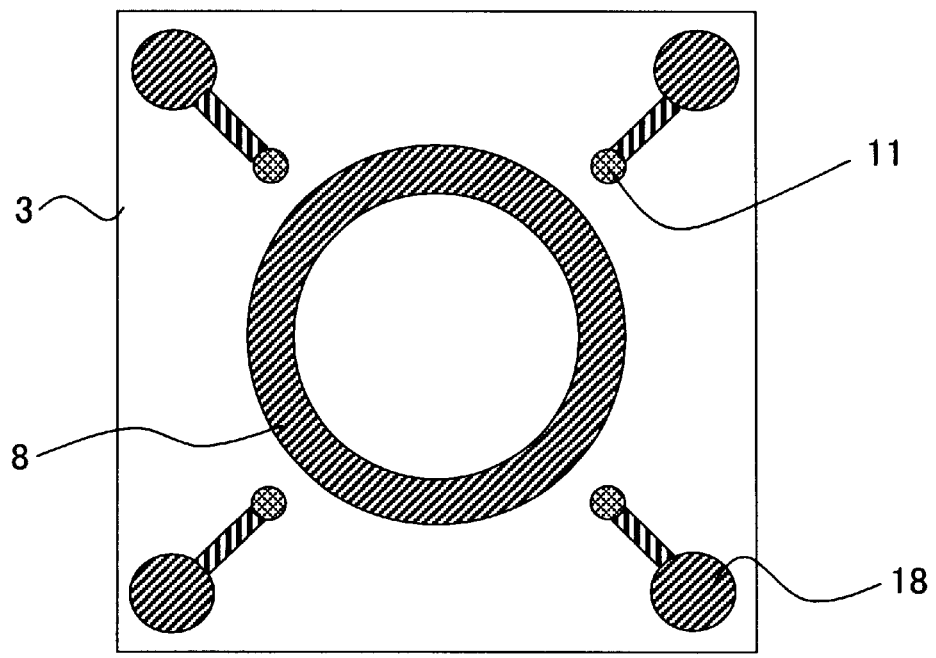
FIG. 8 conceptually shows an arrangement of lead terminals and a lens support pad on the substrate of the magneto-optical head produced in the first embodiment.

Subsequently, the lead terminals 18 and the lens support pad 8 were formed on the surface of the substrate on the lens side such that a copper layer of 3 $\mu$m and a gold layer of 1 $\mu$m were formed by means of plating respectively in a predetermined resist pattern, and then the resist film was removed by ashing (see FIG. 3). The lens support pad 8 was formed to have an annular shape as shown in FIG. 8. Finally, the substrate 70 was cut into pieces of the respective comparted areas with a dicer to obtain a plurality of magnetic coil substrates 90.

The lenses 1, 2 were attached to the magnetic coil substrate 90 thus obtained, in a state in which the lenses 1, 2 were incorporated in the lens holders 7a, 7b respectively as shown in FIG. 1. During this process, the lens holder 7a was positioned with respect to the substrate 3 while adjusting the optical path for the light-transmitting section 50. The space between the lens holder 7a and the substrate 3 was filled with the adhesive 6 from the outer circumferential side of the lens holder 7a. Polyurethane-based adhesive 3951 produced by Loctite was used as the adhesive. In this arrangement, the lens-bonding pad 8 maintains a constant gap between the lens and the glass substrate for the coil, and it prevents the light-outgoing section of the lens 2 from inflow of the adhesive. An anti-reflection film may be formed on each of the light-outgoing section 2a of the lens and the surface 3b of the substrate 3.

Second Embodiment

Figure 9:
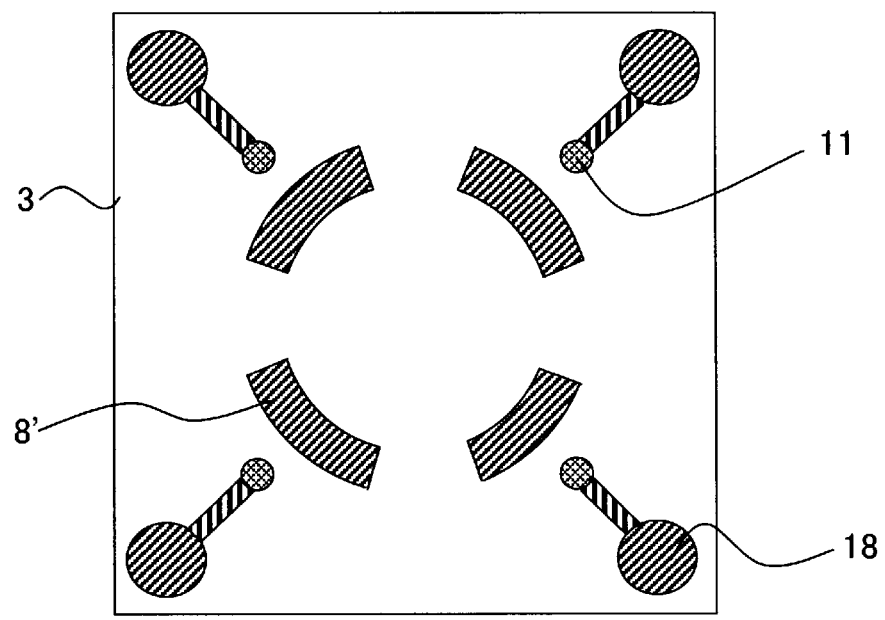
FIG. 9 conceptually shows an arrangement of lead terminals and lens support pads on a substrate of a magneto-optical head produced in a second embodiment.
Figure 10:
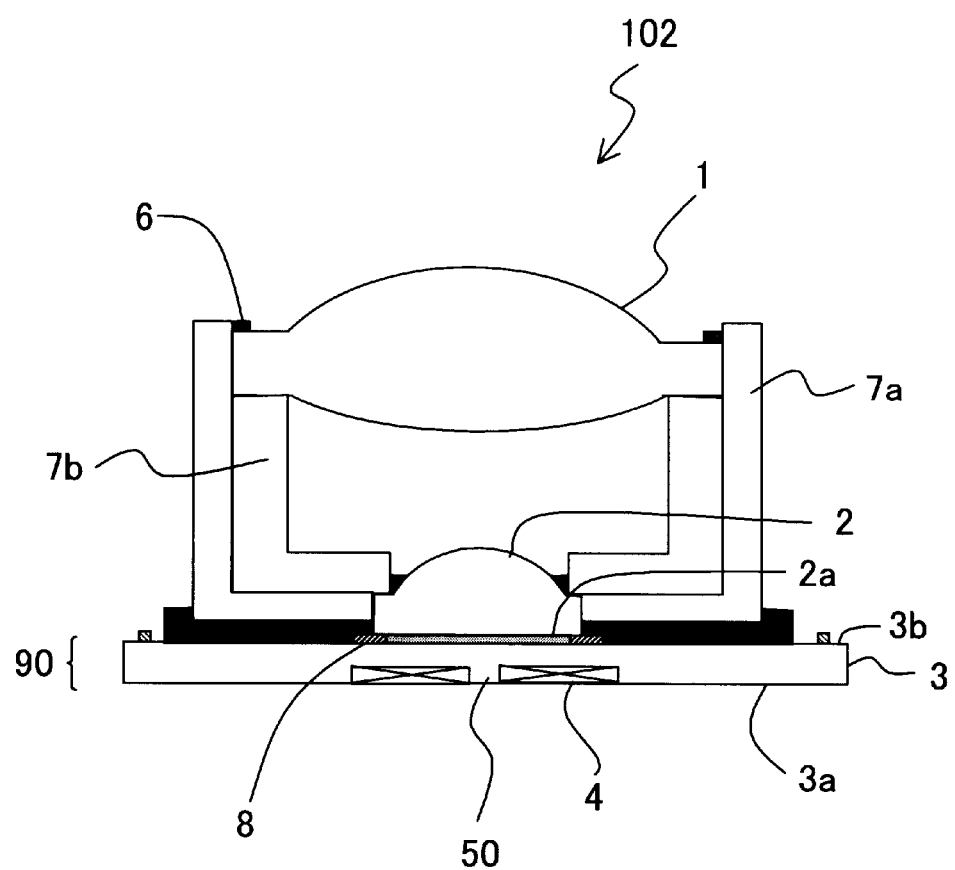
FIG. 10 shows a schematic structure of the magneto-optical head produced in the second embodiment.

A second embodiment of the magneto-optical head according to the present invention will be explained with reference to the drawings. In this embodiment, a magnetic coil substrate was formed in the same manner as in the first embodiment except that a lens support pad 8' was composed of four separated annular portions as shown in FIG. 9. As shown in FIG. 10, a magneto-optical head 102 comprises lenses 1, 2 which are assembled to a substrate 3 by the aid of lens holders 7a, 7b. Also in this embodiment, the lens 2 is placed on the substrate 3 while controlling the spacing distance between the lens 2 and the substrate 3 by the aid of the lens support pad 8'. The lens support pad 8 is composed of the four separated annular portions. Therefore, when the space between the bottom of the lens holder 7a and the substrate surface 3b is filled with an adhesive 6, the adhesive 6 also flows into the space disposed under a light-outgoing section 2a of the lens 2. In this embodiment, those used for the lens 2, the substrate 3, and the adhesive 6 have substantially the same refractive index. Therefore, the refraction of light is avoided when the light is transmitted through these components. Preferably, the difference in refractive index among the lens 2, the substrate 3, and the adhesive 6 is not more than 10%. In this embodiment, the lens and the substrate were formed of quartz (BK7: n=1.512), and two-part epoxy as a thermosetting adhesive, i.e., an adhesive OPTOCAST 3601 (n=1.53) for the optics produced by EMI was used for the adhesive.

Production of Magneto-Optical Disk

Figure 13:
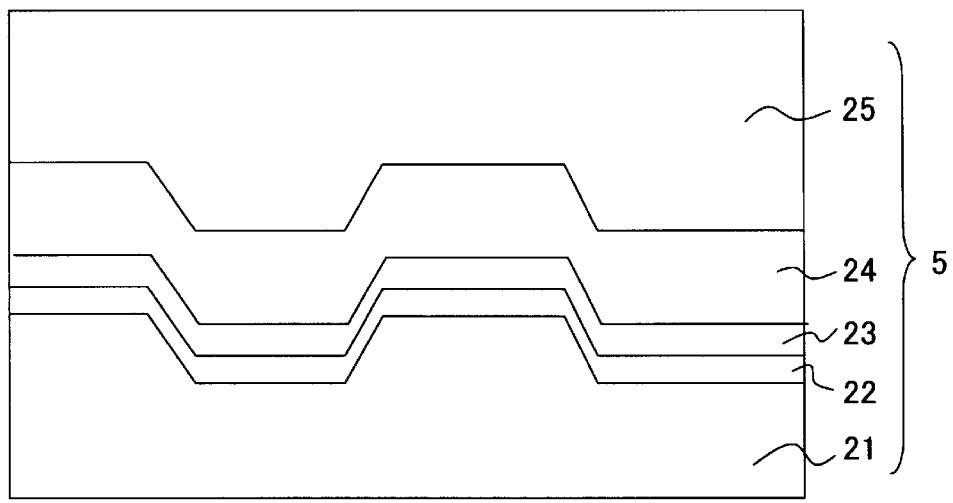
FIG. 13 shows a schematic sectional view illustrating a magneto-optical disk produced in the first embodiment.

A magneto-optical disk having a cross-sectional structure shown in FIG. 13 was produced as follows in order to record and reproduce information with the magneto-optical head of the present invention. A substrate 21 for land recording/ reproduction having a track pitch of 0.6 μm was formed by charging a polycarbonate resin into an injection molding mold provided with a stamper formed with grooves and pits beforehand. The substrate size was as follows. That is, the diameter was 130 mm, the thickness was 1.8 mm, and the center hole diameter was 15 mm. The land width was 0.4 μm, and the groove depth was 60 nm. An in-line system DC magnetron sputtering apparatus was used to form an Au layer having a thickness of 50 nm as a reflective layer 22, a TbFeCo alloy layer having a thickness of 20 nm as a recording and reproducing layer 23, and a silicon nitride layer having a thickness of 60 nm as a transparent dielectric layer 24 on the substrate respectively. Subsequently, an ultraviolet-curable resin layer 25 was formed to have a thickness of 5 μm on the silicon nitride layer by means of spin coat. Finally, a lubricant of perfluoropolyether having hydroxyl groups at both terminals was formed as a lubricant layer to have an average film thickness of 1 nm by means of spin coat. The film formation conditions for the respective layers were as follows. The silicon nitride layer was formed as a film by means of sputtering at a flow rate of 130 sccm (degree of vacuum: 2.0 Pa) and an applying power of 2 kW with a silicon target by using a mixed gas of $Ar-N_2$ (mixing ratio: 2:1). The Au layer was formed as a film by means of sputtering at a flow rate of 80 sccm (degree of vacuum: 1.2 Pa) and an applying power of 2 kW with an Au target by using Ar gas. The TbFeCo alloy layer was formed as a film by means of sputtering under a condition of a flow rate of 100 sccm (degree of vacuum: 1.5 Pa) and an applying power of 500 kW with a $Tb_{23}Fe_{67}Co_{10}$ (atomic %) alloy target by using Ar gas.

The magneto-optical disk was incorporated into a drive provided with the magneto-optical head produced in each of the first and second embodiments. A predetermined test signal was recorded to measure the error rate. The Push-Pull system was used for the tracking. The number of revolutions of the disk was 3600 revolutions per minute.

At first, in order to measure the magnetic field from the magnetic coil 15 provided in the substrate 3 as shown in FIG. 1, a large-sized coil to be used in the optical modulation recording system was installed at a position opposed to the magnetic coil 15 with the disk intervening therebetween with respect to the magnetic coil 15. The magnetic field generated from the large-sized coil was measured with a Gauss meter. This arrangement was made for the following reason. That is, it is difficult to directly measure the magnetic field generated by the magnetic coil 15, because the magnetic coil 15 is subminiature-sized. The magnetic field generated by the large-sized coil was applied as a bias magnetic field. Subsequently, the disk was attached to the drive, and it was rotated. The laser power was regulated to record the test signal on the disk while applying the focus servo and the tracking servo. In this process, the magnetic field generated by the coil of the present invention was determined by determining the bias magnetic field at which the magneto-optical signal was zero as a result of the balance between the bias magnetic field applied by the large-sized coil and the magnetic field generated by the magnetic coil 15. The magnetic field generated from the magnetic coil of the magneto-optical head was adjusted to 150 (Oe) by adjusting the current flowing through the coil 15. The spacing distance between the disk and the coil protective film 17 was 10 μm.

The error rate was measured with an optimum recording power by using the drive. As a result, the error rate was not more than $1 \times 10^{-4}$ for a mark having a mark length of 350 nm. It was revealed that the error rate was at a level at which the reproduction channel sufficiently functioned. The system of 1–7 (PR class 1) was used for the data modulation system. It is appreciated that a storage capacity of about 15 Gbits can be achieved on one surface of the disk by using the zone CAV system with the mark length as described above.

Figure 14:
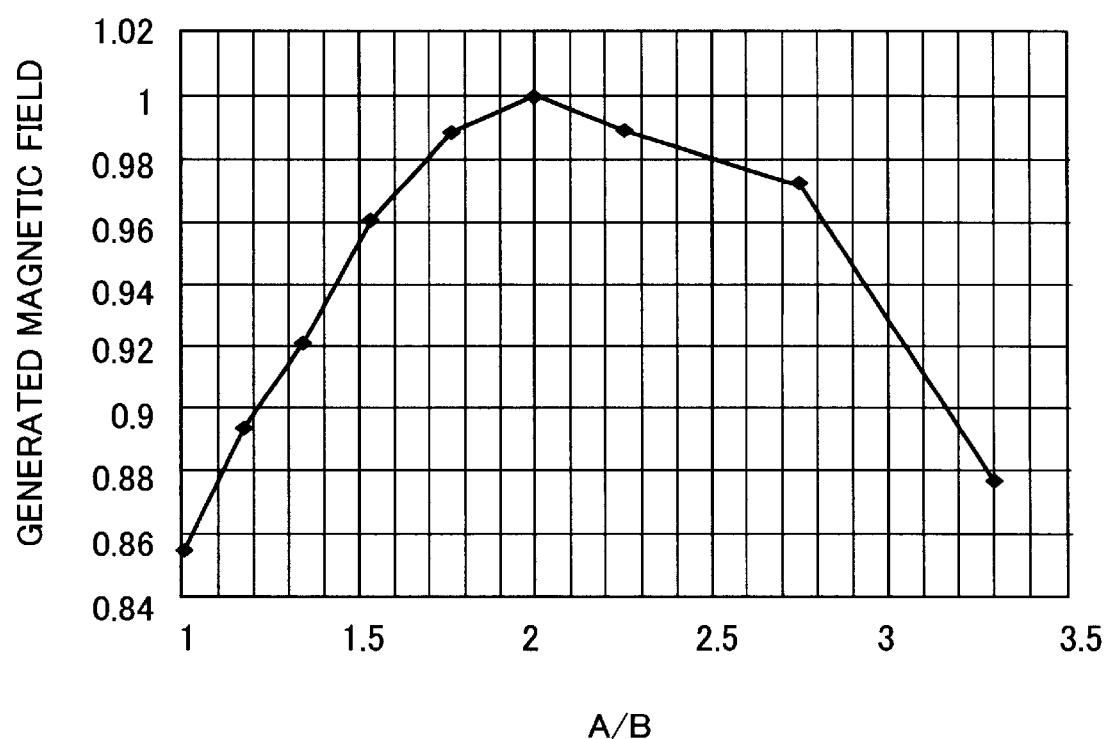
FIG. 14 shows a graph illustrating the change of the magnetic field generated from the magnetic coil 15 with respect to the areal size ratio A/B between the apertures of a soft magnetic layer formed on the lens side and a soft magnetic layer formed on the disk side.

In order to investigate the way of influence of the areal size ratio of the aperture between the soft magnetic layer 13a formed on the lens side and the soft magnetic layer 13b formed on the disk side on the magnetic field generated from the magnetic coil 15, the areal size of the aperture of the soft magnetic layer 13b formed on the disk side was changed to have a variety of values, and the magnitude of the generated magnetic field was measured. An obtained result is shown in FIG. 14. In FIG. 14, the horizontal axis represents the ratio A/B between the areal size A of the aperture of the soft magnetic layer 13b formed on the disk side and the areal size B of the aperture of the soft magnetic layer 13a formed on the lens side. The vertical axis represents the value obtained by measuring the magnetic field with an identical current for the disks having the different areal size ratios as described above and normalizing the generated magnetic fields of the respective disks at the maximum measured magnetic field (optimum areal size ratio). It is understood that the magnetic field of not less than 90% of the maximum measured magnetic field (optimum areal size ratio) is generated within a range of $1.2 \leq A/B \leq 3.1$. Therefore, it is preferable that A/B is approximately from 1.2 to 3.2.

Figure 12:
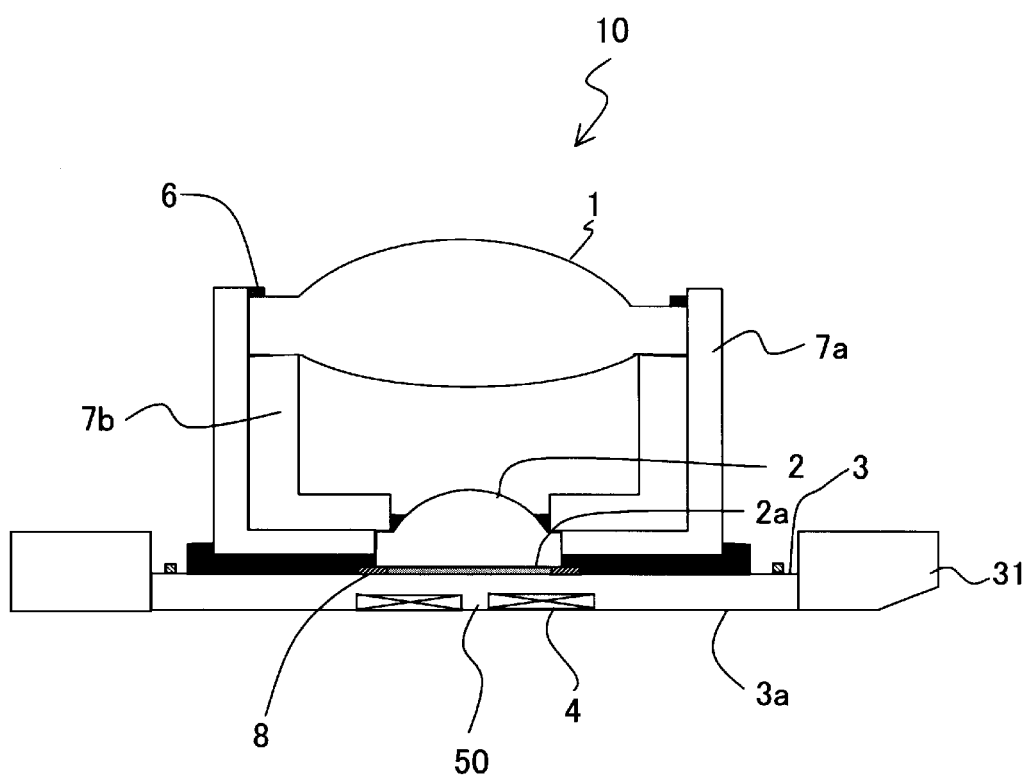
FIG. 12 shows the magneto-optical head of the second embodiment in a state of being carried on an air slider.

The magneto-optical head produced in each of the first and second embodiments can be carried on an air slider 31 as shown in FIG. 12 so that the magneto-optical head may be used as a floating type head. In this arrangement, the disk and the lens can be disposed closely to one another in a stable manner without using the focus servo system. The air slider is connected to a rotary actuator by the aid of an unillustrated arm. An optical system for feeding the laser beam to the magneto-optical head can be attached to the tip of the arm. The magneto-optical recording signal and the signal required for the tracking can be detected, for example, with a detecting unit attached to the proximal end of the arm. The same detecting system as that used for the known magneto-optical recording apparatus can be used.

Third Embodiment

Figure 11:
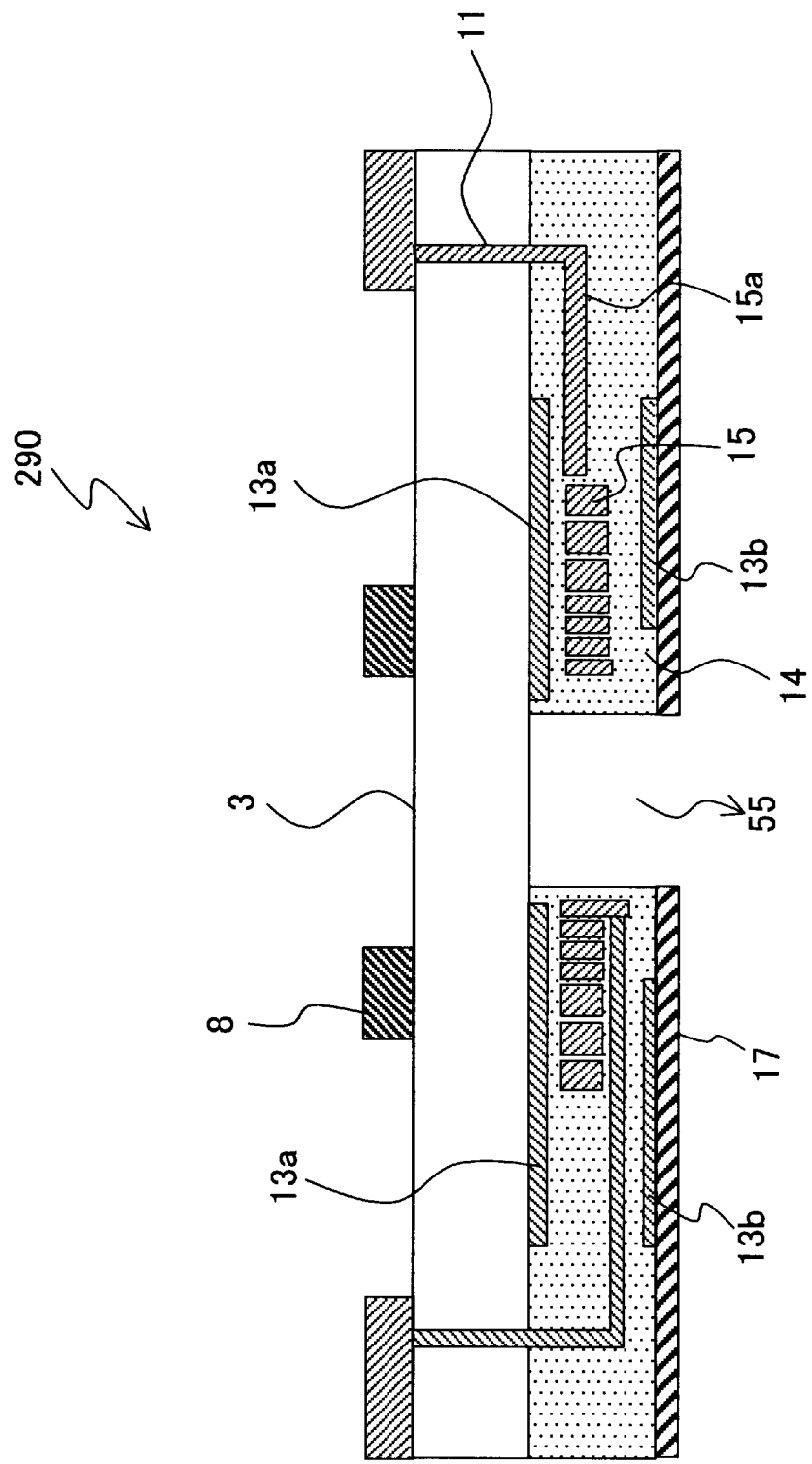
FIG. 11 shows a schematic sectional view illustrating a magnetic coil substrate of a magneto-optical head produced in a third embodiment.

In this embodiment, a magnetic coil substrate was produced in the same manner as in the first embodiment except that the protruding section 50 was not allowed to remain in the magnetic coil substrate 90 shown in FIG. 3. As shown in FIG. 11, no glass material exists in a light-transmitting section 55 located at the center of the coil 15 in the magnetic coil substrate 290. Such a structure is obtained without firstly etching the substrate 3, i.e., by omitting the process steps (a) and (b) shown in FIG. 6. When the protruding section 50 is changed to the space as described above, then the process for producing the coil is simplified, and it is possible to obtain an extremely smooth plane of the coil formation surface. Thus, the productivity is improved. The magnetic coil substrate 290 obtained as described above can be used to construct a magneto-optical head by incorporating the objective lens system in the same manner as in the first embodiment.

Fourth Embodiment

Figure 15:
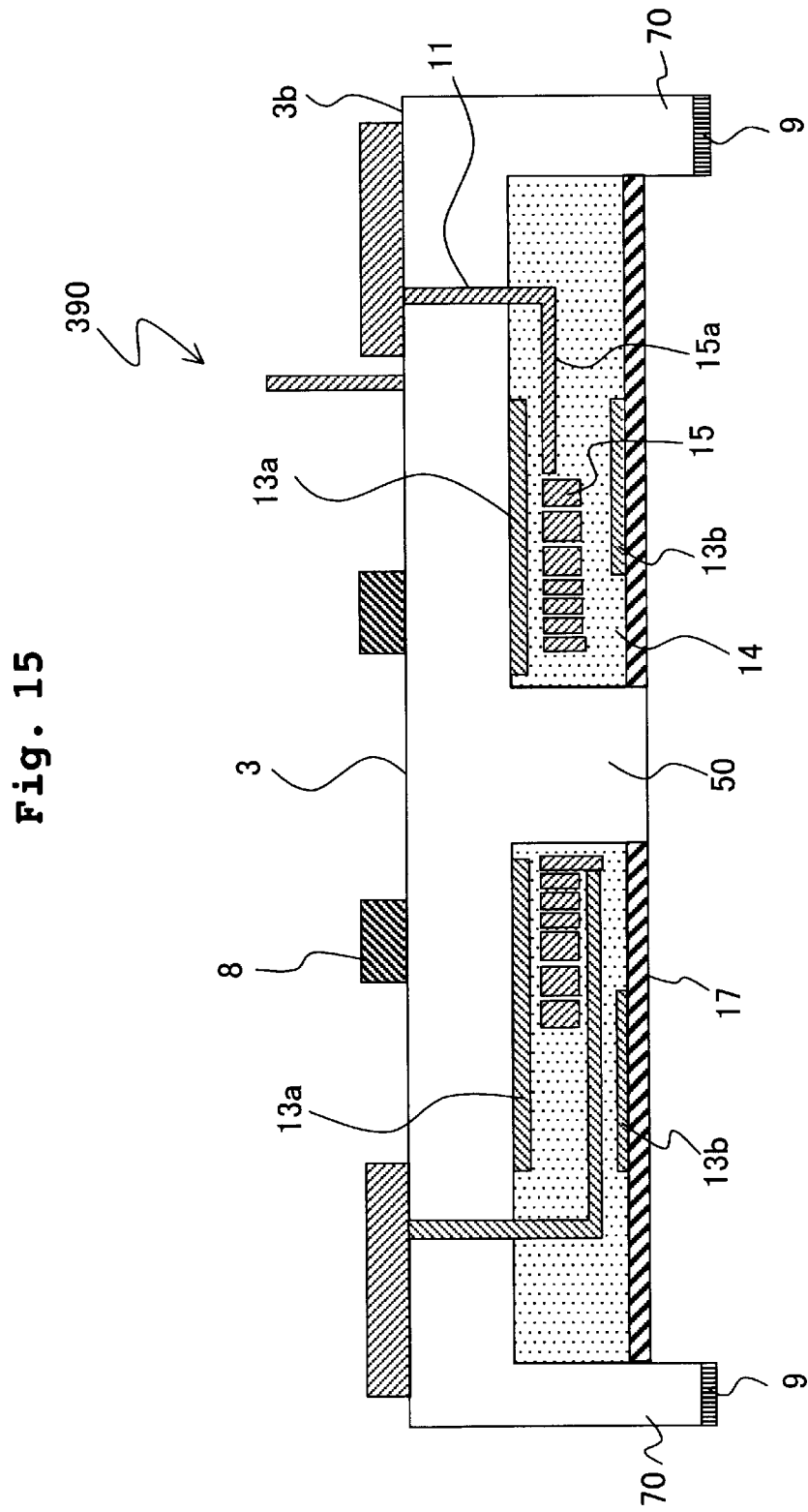
FIG. 15 shows a schematic sectional view illustrating a magnetic coil substrate formed with a projection 70 produced in the fourth embodiment.
Figure 16:
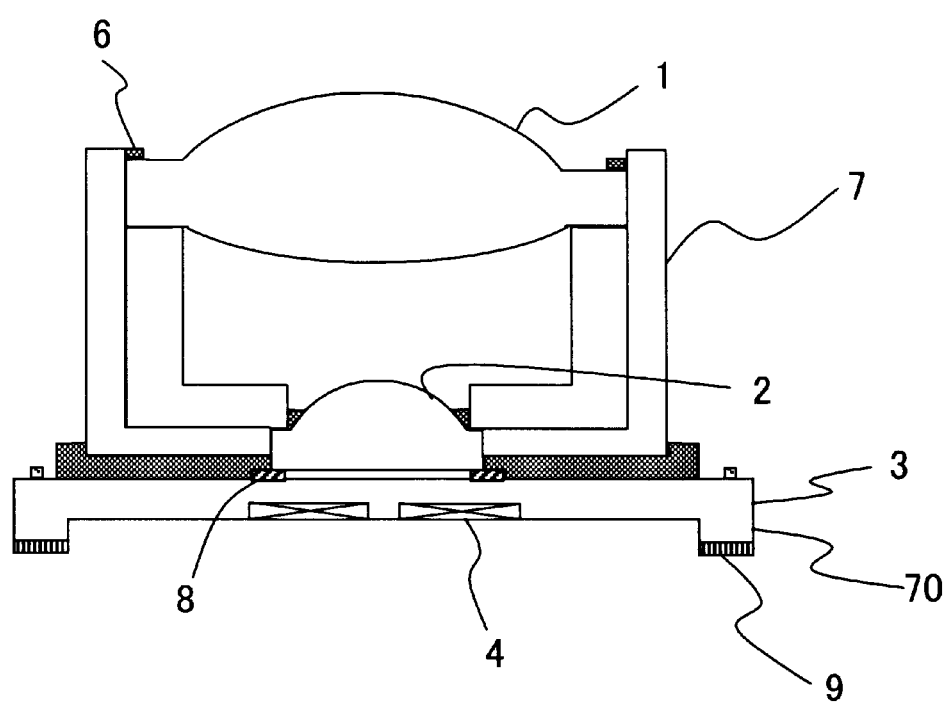
FIG. 16 schematically shows a structure of a magneto-optical head incorporated with the magnetic coil substrate shown in FIG. 15.

In this embodiment, a magnetic coil substrate 390 was produced in the same manner as in the first embodiment except that a frame-shaped projection 70 was formed at an outer circumferential portion of the surface 3a of the coil support substrate 3 on the disk side as shown in FIGS. 15 and 16. The projection 70 was formed so that the projection 70 was higher than the protruding section 50 of the light-transmitting section. The projection 70 may be formed, for example, as follows. A mask is also provided at an outer portion of the substrate 3 corresponding to the projection 70 in the process steps shown in FIGS. 6(a) and 6(b) to perform the reactive etching. Subsequently, a mask is formed for only the obtained projection 70, and only the mask for the protruding section 50 is removed. Further, the reactive ion etching is performed. It is preferable that the projection 70 protrudes from the protruding section 50 by about 1 to 2 μm. The projection 70 obtained as described above protects the magnetic coil 15, and it avoids any adhesion of dirt, dust or the like in the vicinity of the light-transmitting section.

Further, as shown in FIG. 15, a protective film 90 may be formed on the projection 70. Those usable as the material for the protective film 9 include, for example, silicon oxide, silicon nitride, zirconia, and diamond-like carbon. The thickness of the protective film is preferably 0.1 to 0.2 μm.

The objective lens system was incorporated into the magnetic coil substrate 390 obtained as described above in the same manner as in the first embodiment to construct a magneto-optical head as shown in FIG. 16. The same magneto-optical disk as that produced in the first embodiment was incorporated into a drive provided with the magneto-optical head produced in this embodiment. A predetermined test signal was recorded to measure the error rate. The Push-Pull system was used for the tracking. The number of revolutions of the disk was 3600 revolutions per minute. The magnetic field generated from the coil of the head was adjusted to 150 (Oe) by adjusting the current flowing through the coil 15. The spacing distance between the disk and the coil protective film 14 was 10 μm. The error rate was measured with an optimum recording power by using the drive. As a result, the error rate was not more than $1 \times 10^{-4}$ for a mark having a mark length of 350 nm. It was revealed that the error rate was at a level at which the reproduction channel sufficiently functioned. The system of 1–7 (PR class 1) was used for the data modulation system. It is appreciated that a storage capacity of about 15 Gbits can be achieved on one surface of the disk by using the zone CAV system with the mark length as described above.

A magneto-optical disk recording and reproducing apparatus based on the use of the magneto-optical head produced in the fourth embodiment as a pickup (fixed type) and a magneto-optical disk recording and reproducing apparatus based on the use of the magneto-optical head produced in the fourth embodiment as a floating type head were prepared respectively. The magneto-optical disk produced in the first embodiment was accommodated in an ISO disk cartridge of 5.25 inch size. The cycle of the disk storage and the recording and reproduction test was repeated to investigate the durability. This experiment was performed in an ordinary office environment (temperature: about 25° C.). For the purpose of comparison, the experiment was performed for those in which silicon oxide, silicon nitride, zirconia, and diamond-like carbon were applied as a protective film onto the surface of the projection 70, no protective film was applied, and no projection 70 (pad) was formed for comparison.

Obtained results are shown in Table 2. The durability represents the number of cycles at which the error rate was deteriorated by not less than 30% even in the sector of one track after performing the recording and reproduction for ten tracks from the innermost circumference to the outermost circumference at several positions.

In the case of the head of the pickup system, the control was made as follows. That is, when the disk entered the recording and reproducing apparatus, the disk was rotated for 5 seconds. After that, the rotation was once stopped, and then the focus servo was operated at the inner circumference of the disk. Subsequently, the disk was rotated again, and then the head was moved from the inner circumference to the outer circumference to perform recording and reproduction for specified tracks at several positions. The reason why the rotation of the disk is once stopped upon the operation of the focus servo and the focus operation is started for the inner circumferential area is as follows. That is, it is intended to avoid any failure of introduction of the focus servo due to the surface fluctuation of the disk, and it is intended to avoid any off-position of the focus servo when the disk is rotated after operating the focus servo, because the smallest surface fluctuation is given in the inner circumferential area.

The floating type head was evaluated by making control as follows. That is, the head was loaded onto an outer circumferential position on the disk in accordance with the lamp load system after rotating the disk, and the head was moved from the outer circumference to the inner circumference to perform recording and reproduction for specified tracks at several positions. Subsequently, the head was moved to an outer circumferential position, and the head was unloaded.

TABLE 2

| | Head system | Presence or absence of projection | Protective film | Durability (K cycles) |
|---|---|---|---|---|
| Example 1 | pickup | present | absent | 40 |
| Example 2 | pickup | present | silicon oxide | 50 |
| Example 3 | pickup | present | silicon nitride | 70 |
| Example 4 | pickup | present | zirconia | 90 |
| Example 5 | pickup | present | silicon nitride + DLC | 120 |
| Example 6 | floating type | present | absent | 25 |
| Example 7 | floating type | present | silicon oxide | 30 |
| Example 8 | floating type | present | silicon nitride | 40 |
| Example 9 | floating type | present | zirconia | 60 |
| Example 10 | floating type | present | silicon nitride + DLC | 80 |
| Example 11 | pickup | absent | absent | 10 |
| Example 12 | floating type | absent | absent | 8 |

As shown in Table 2, the durability of the drive is improved by forming the projection 70 (pad). It is understood that the durability is further improved by forming the protective film of silicon oxide, silicon nitride, zirconia, or diamond-like carbon (DLC) on the surface of the projection 70. Especially, the durability is remarkably increased when silicon oxide is formed on the surface of the projection 70, and diamond-like carbon (DLC) is formed thereon, probably for the following reason. That is, the abrasion is decreased, and the coefficient of friction is lowered.

Fifth Embodiment

Figure 17:
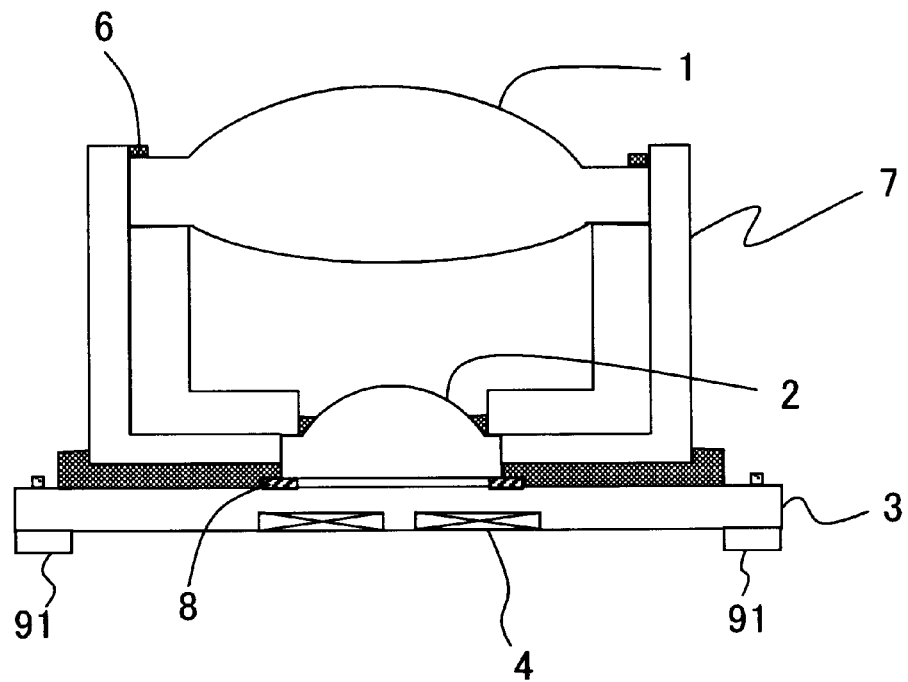
FIG. 17 shows a schematic structure of a magneto-optical head having a magnetic coil substrate provided with a pad produced in a fifth embodiment.
Figure 18:
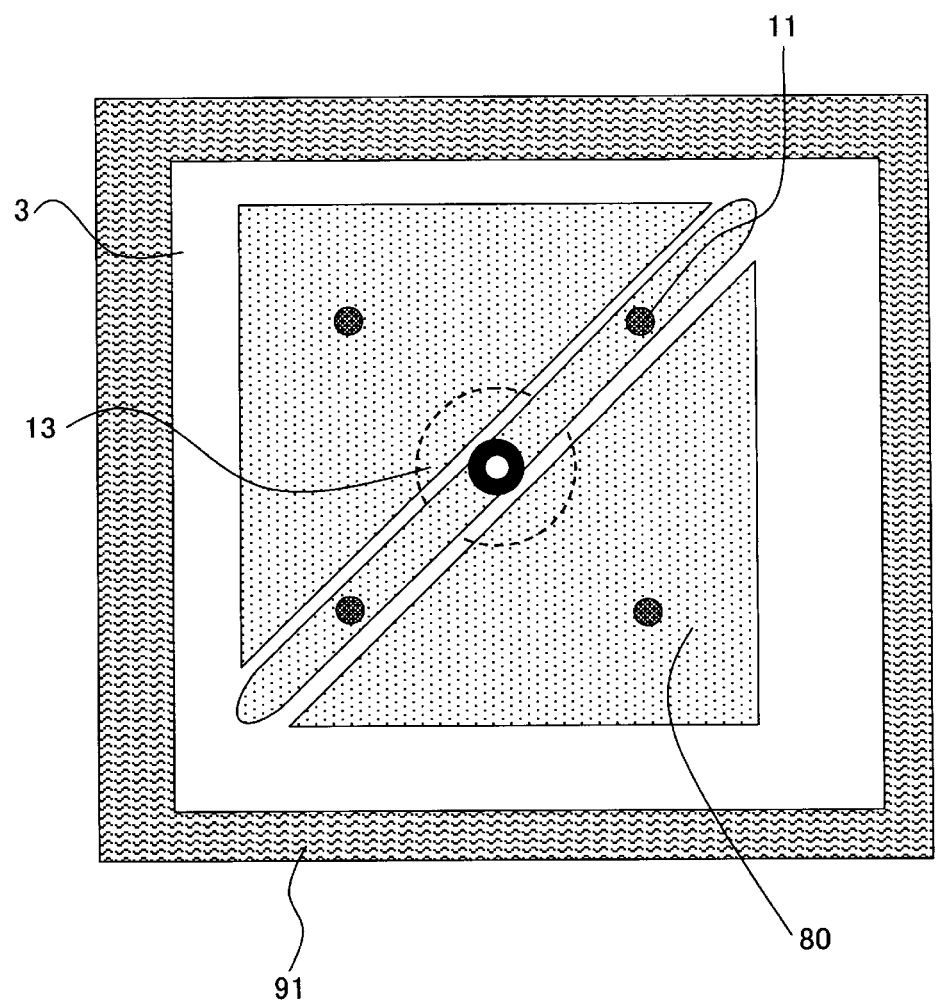
FIG. 18 shows the shape of the pad 91 provided for the substrate of the magneto-optical head produced in the fifth embodiment.

The fifth embodiment is a modified embodiment of the fourth embodiment, which will be explained with reference to FIGS. 17 to 20. In this embodiment, a magneto-optical head was produced by providing a protective pad 91 as shown in FIG. 17 in place of the projection 70 of the magnetic coil substrate produced in the fourth embodiment. The magnetic coil substrate as described above can be produced as follows. In the process steps shown in FIGS. 6(*a*) and 6(*b*), the reactive etching is performed while providing the mask not only for the protruding section 50 of the substrate 3 but also for an outer circumferential portion corresponding to the projection 70. Accordingly, the projection 70 can be formed to have the same height as that of the protruding section 50. The protective pad 91 may be bonded onto the projection 70. The protective pad can be formed with resin as described later on. As shown in FIG. 18, for example, a frame-type pad 91, which was provided on the entire outer circumference (edge) having the rectangular shape of the substrate, was used for the protective pad. As an alternative example, bump-type pads 291, which were provided on only four corners, were used as shown in FIG. 20. Each of the protective pads 91, 291 was produced such that polyacetal or polyacrylate resin was formed into a predetermined shape by using a previously produced mold. The pad was formed and stuck onto the outer circumference of the substrate with an epoxy-based adhesive.

Figure 19:
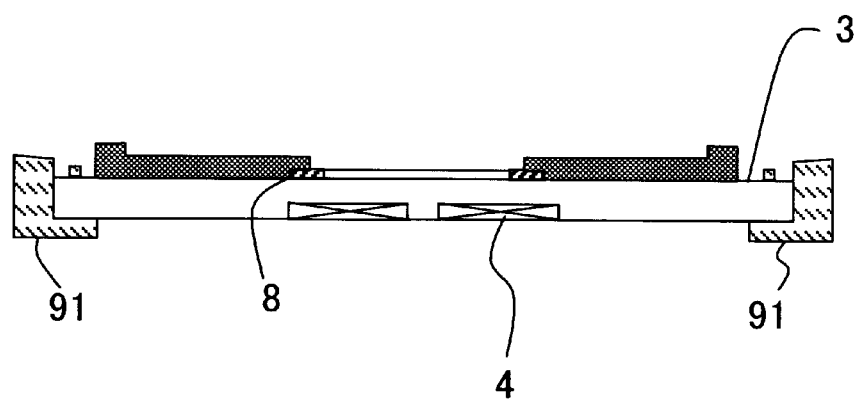
FIG. 19 shows an attachment form (fitting type) which is different from that shown in FIG. 17 illustrating the pad provided for the substrate of the magneto-optical head produced in the fifth embodiment.
Figure 20:
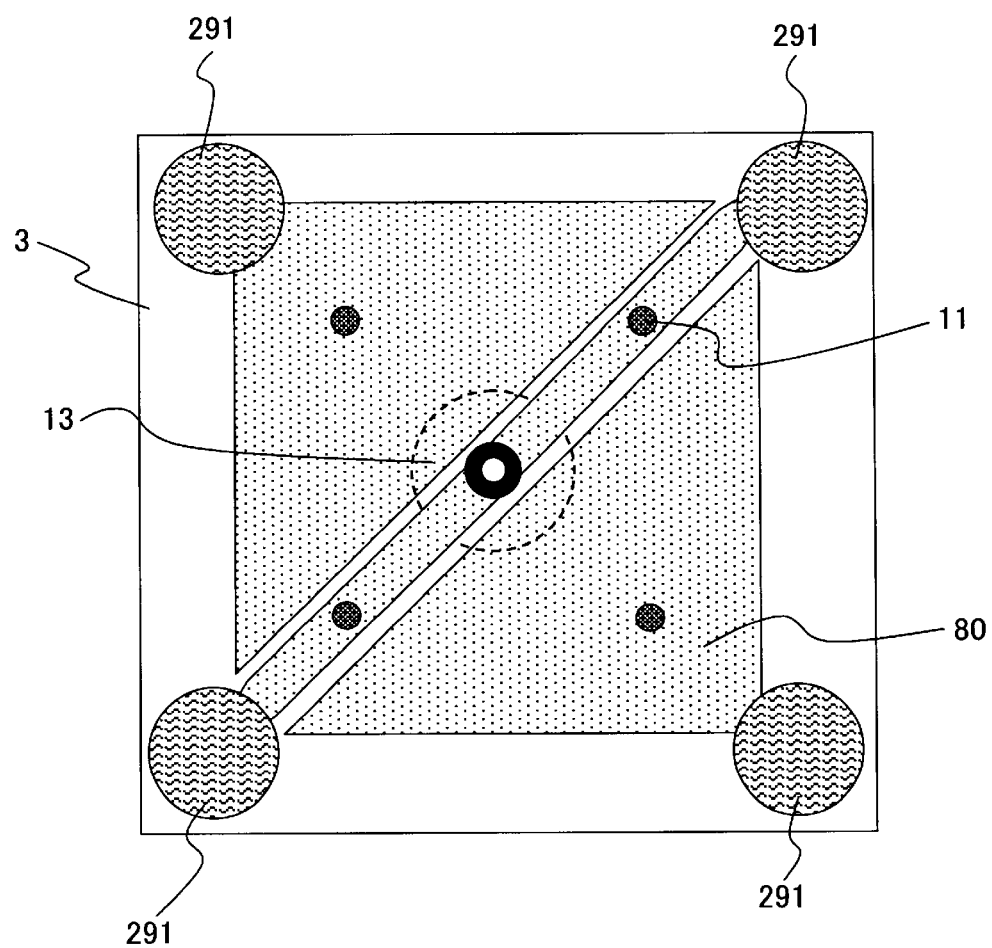
FIG. 20 shows a bump-type pad 291 provided for the substrate of the magneto-optical head produced in the fifth embodiment.

A pad 91 may be formed so that the pad 91 is fitted to the outer circumference of the substrate 3 as shown in FIG. 19, in place of being stuck to the substrate 3 as shown in FIG. 18. It is desirable that the height of the pad is about ⅕ to ½ of the spacing distance between the magnetic coil and the disk surface. If the height is less than ⅕, the ability to protect the coil is insufficient. If the height is larger than ½, then it is difficult to maintain the accuracy of inclination when the magnetic coil chip is attached, and the mass-productivity is lowered.

The cycle of the disk storage and the recording and reproduction test was repeated to investigate the durability, while placing the magneto-optical disk in an ISO disk cartridge of 5.25 inch size, by using a magneto-optical disk recording and reproducing apparatus based on the use of a magneto-optical head (pickup) formed with the pad as described above. This experiment was performed in an ordinary office environment. The pad made of polyacetal and the pad made of polyacrylate were used as the pad. As for the shape of the pad, the experiment was performed for the frame-type and the bump-type. For the purpose of comparison, the experiment was also performed for a sample in which no pad was formed. Obtained results are shown in Table 3 below. The durability represents the number of cycles at which the error rate was deteriorated by not less than 30% even in the sector of one track after performing the recording and reproduction for ten tracks from the innermost circumference to the outermost circumference at several positions.

TABLE 3

| | Head system | Shape of pad | Material of pad | durability (k cycles) |
|---|---|---|---|---|
| Example 1 | pickup | frame-type | polyacetal | 61 |
| Example 2 | pickup | frame-type | polyacetal | 65 |
| Example 3 | pickup | bump-type | polyacetal | 59 |
| Example 4 | pickup | bump-type | polyacrylate | 63 |
| Example 5 | pickup | no pad | — | 9 |

As appreciated from Table 3, it is understood that the durability of the drive is improved by forming the coil-protective pad with the resin. Those usable as the material for the protective pad include, for example, polyethylene, polystyrene, polypropylene, polycarbonate, polyacrylate, polymethacrylate, ABS resin, polyethylene terephthalate, polyacetal, polyarylate, nylon, polyether imide, polyether amide, phenol resin, and fluororesin such as perfluoropolyethylene.

Sixth Embodiment

Figure 21:
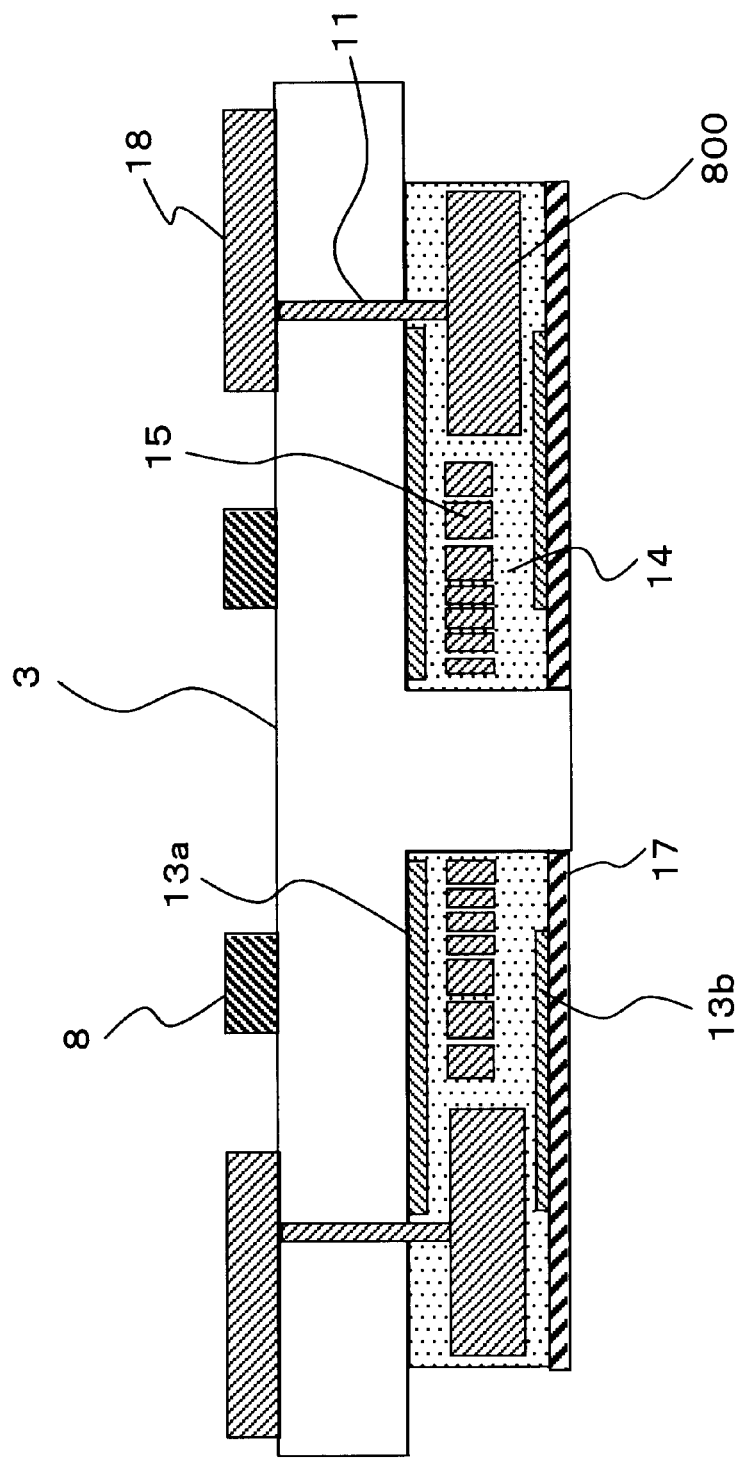
FIG. 21 shows a schematic sectional view illustrating a magnetic coil substrate produced in a sixth embodiment.

FIG. 21 shows a modified embodiment of the first embodiment. A magnetic coil substrate shown in FIG. 21 is produced in the same manner as in the first embodiment except that the film thickness of a heat sink layer 800 is thicker than that in the first embodiment, and the lower end of the heat sink layer 800 is disposed more closely to the disk side. The heat, which is generated from the magnetic coil 15 and which is transmitted to the heat sink layer, is readily released to the space between the disk and the substrate 3, because the heat sink layer 800 is disposed more closely to the disk side. Therefore, the heat-releasing effect of the heat sink layer is improved. The heat sink layer may further extend downwardly to make contact with the protective film 17. Alternatively, the heat sink layer may be exposed to the disk side without providing the protective film 17 partially. By doing so, the heat-releasing effect of the heat sink layer can be further improved.

Seventh Embodiment

Figure 26:
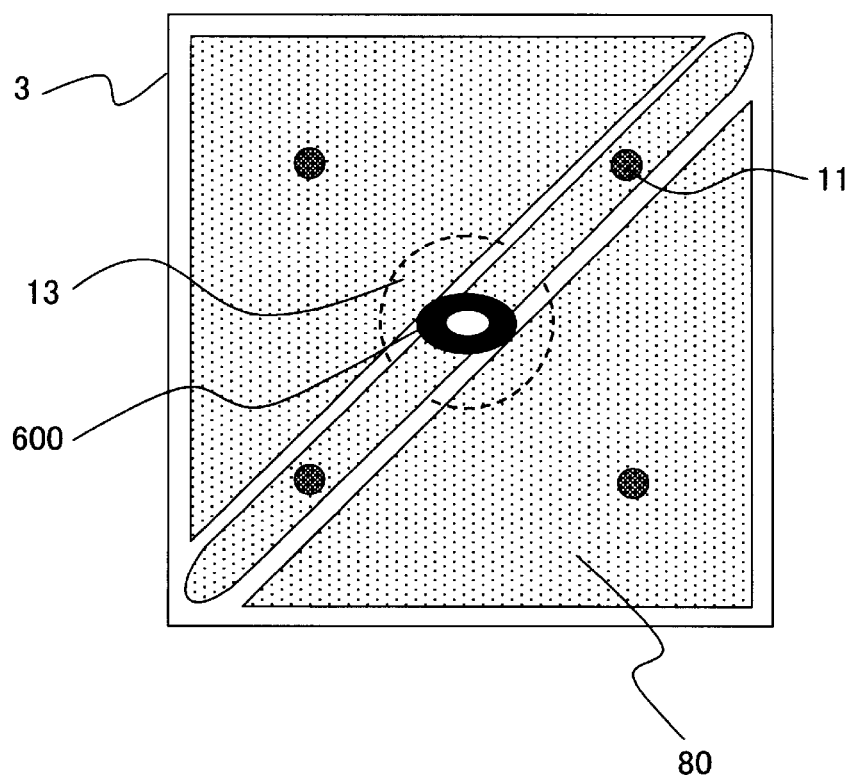
FIG. 26 schematically shows a perspective back view illustrating a magnetic coil substrate provided with a magnetic coil pattern having an elliptic configuration produced in a seventh embodiment.

In this embodiment, a magnetic coil substrate was formed in the same manner as in the first embodiment except that a magnetic coil 600 was formed to have an elliptic configuration as shown in FIG. 26. A magneto-optical head was produced with the magnetic coil substrate. The elliptic magnetic coil can be formed with ease by exposing the photoresist to the light with an elliptic helical pattern as a photomask in the step for forming the coil shown in FIG. 6(*d*).

The reason why the magnetic coil 600 was formed to have the elliptic configuration is as follows. That is, it is necessary to perform the tracking for the disk when information is recorded or reproduced on the magneto-optical disk by using the magneto-optical head. The tracking is performed by operating a rotary actuator for supporting a head and a galvano-mirror provided for a fixed optical system (see FIG. 25) installed with a laser light source and a detector by the aid of an arm. The light beam, which is reflected by the galvano-mirror, is fed to a movable optical system such as a lens carried on the head. In this arrangement, the high speed operation in the tracking is performed by moving the galvano-mirror. However, the light beam is deflected in a direction (radial direction of the disk) perpendicular to the traveling direction of the disk in accordance with the movement of the galvano-mirror. In this process, the light beam can be radiated onto the disk without being shielded by the magnetic coil even when the light beam is deflected in the radial direction of the disk during the tracking, provided that the magnetic coil is formed beforehand to have the elliptic configuration in which the radial direction of the disk corresponds to the major axis.

Eighth Embodiment

Figure 27:
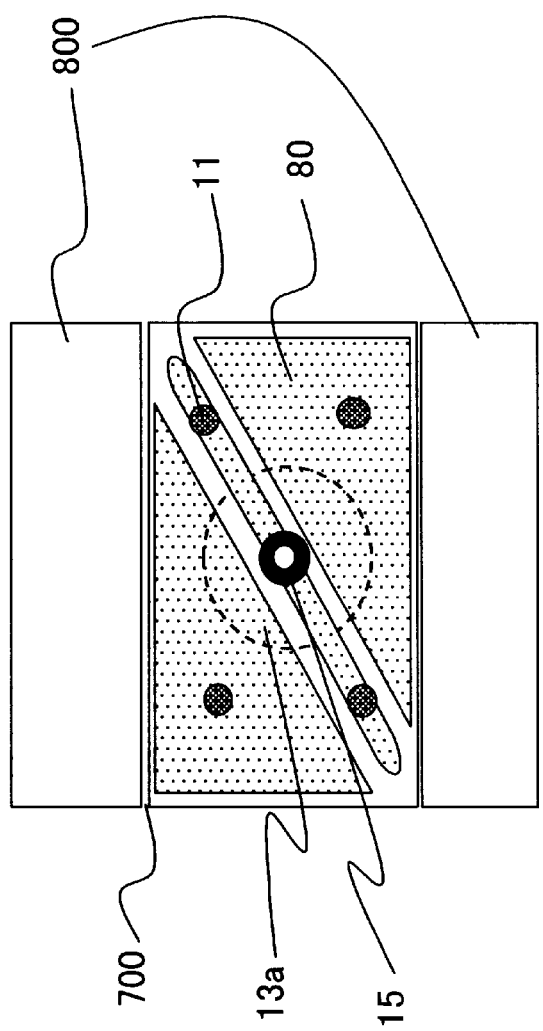
FIG. 27 schematically shows a perspective back view illustrating a magnetic coil substrate having an oblong substrate produced in an eighth embodiment.

In this embodiment, a magnetic coil substrate was formed in the same manner as in the first embodiment except that a substrate 700, on which the magnetic coil was provided, was formed to have an oblong or rectangular configuration as shown in FIG. 27. A magneto-optical head was produced with the magnetic coil substrate. When the glass substrate 700 is formed to have the rectangular configuration, then it is possible to decrease the areal size of the substrate on which one magnetic coil is installed, and it is possible to lower the production cost. In this embodiment, the substrate 700 had a size of 4.4 mm×1.5 mm. Protective substrates 800 made of aluminum were installed on both sides of the glass substrate 700.

Application to other Recording Media

The magneto-optical heads produced in the embodiments described above are not limited to the magneto-optical head, which are also usable to perform recording and reproduction on phase-change recording media, especially phase-change recording media of the film surface incidence type and recording media based on the use of dye (for example CD-R). In the case of the phase-change recording media and the recording media based on the use of dye, it is unnecessary to apply the magnetic field every time when recording and reproduction are performed. Therefore, such media can be used in order to radiate the light without operating the magnetic coil. In such a situation, it has been revealed that the projection on the substrate formed in the fourth embodiment and the pad formed in the fifth embodiment are also effective when recording and reproduction are performed on phase-change recording media, especially phase-change recording media of the film surface incidence type and recording media based on the use of dye (for example, CD-R), according to similar durability tests based on the use of the phase-change recording media and the dye recording media in place of the magneto-optical disk used in the durability test performed in the fourth embodiment.

At first, a phase-change recording medium was produced in accordance with the following method. A substrate for land recording and reproduction having a track pitch of 0.6 μm was formed by charging polycarbonate resin into an injection molding mold installed with a stamper previously formed with grooves and pits. The substrate size was as follows. That is, the diameter was 120 mm, the thickness was 1.1 mm, and the center hole diameter was 15 mm. The land width was 0.4 μm, and the groove depth was 60 nm. An inline system magnetron sputtering apparatus was used to form a reflective layer of AgRuAu layer having a thickness of 100 nm, an intermediate layer of ZnS—SiO$_2$ layer having a thickness of 20 nm, a recording layer of GeSnSbTe alloy layer having a thickness of 20 nm, and a transparent dielectric layer of ZnS—SiO$_2$ layer having a thickness of 120 nm on the substrate respectively.

An ultraviolet-curable resin layer was formed to have a thickness of 5 μm on the ZnS—SiO$_2$ layer by means of spin coat. Finally, a lubricant of perfluoropolyether having hydroxyl groups at both terminals was formed as a lubricant layer to have an average film thickness of 1 nm by means of spin coat. The film formation conditions for the respective layers were as follows. The film of the ZnS—SiO$_2$ layer was formed by sputtering a (ZnS)$_{80}$(SiO$_2$)$_{20}$ (mole %) target with Ar gas at a flow rate of 130 sccm (degree of vacuum: 2.0 Pa) with an applying power of 1 kW. The film of the AgRuAu layer was formed by sputtering an Ag$_{98}$Ru$_1$Au$_1$ (atomic %) target with Ar gas at a flow rate of 80 sccm (degree of vacuum: 1.2 Pa) with an applying power of 2 kW. The film of the GeSnSbTe alloy layer was formed by sputtering a Ge$_{15}$Sn$_{15}$Sb$_{15}$Te$_{55}$ (atomic %) target with Ar gas under a condition of a flow rate of 100 sccm (degree of vacuum: 1.5 Pa) with an applying power of 200 W.

The phase-change recording medium was placed in a disk cartridge. The cycle of the disk storage and the recording and reproduction test was repeated in the same manner as in the fourth embodiment to investigate the durability. As a result, approximately the same results as those shown in Table 2 were obtained. Further, approximately the same results as those shown in Table 2 were also obtained in the case of a dye recording medium comprising a dye layer based on the use of azo-based dye and a reflective layer of Ag$_{98}$Ru$_1$Au$_1$ (atomic %).

According to the fact described above, it has been revealed that the durability of the drive is improved owing to the formation of the projection 70, and the durability is further improved when silicon oxide, silicon nitride, zirconia, or diamond-like carbon is formed as the protective film on the surface of the pad section, also in the case of the phase-change recording medium of the film surface incidence type and the dye recording medium as well as in the case of the magneto-optical recording medium. When silicon oxide was formed on the surface of the projection 70, and diamond-like carbon was formed thereon, then the durability was especially increased in the same manner as in the magneto-optical medium.

In the experiments described above, the magneto-optical head produced in the embodiment was used. However, it is also possible to use one having no magnetic coil, because no external magnetic field is required in the case of the phase-change recording medium. That is, it is enough to omit only the steps (d) and (f) for forming the magnetic coil 15 in the process for forming the magnetic coil substrate shown in FIG. 6. According to such a process, it is easy to produce a magnetic coil substrate in which no magnetic coil 15 exists unlike FIG. 15. A head as shown in FIGS. 1, 12, and 17 can be constructed with the substrate as described above. Such a head may be operated as a head to be exclusively used for recording and/or reproduction on the phase-change recording medium or the dye recording medium.

That is, according to the present invention, it is also possible to provide an optical head to be used for recording information on an information-recording medium; comprising a lens which collects light onto the information-recording medium; a substrate which has a first surface and a second surface parallel to one another and which supports the lens on the first surface; and a projection or a protective pad which is provided on the second surface of the substrate. The protective pad may be constructed with a resin material as described above.

According to various experiments and investigations, the following fact has been consequently revealed. That is, in the case of the magneto-optical recording medium and the phase-change recording medium, when the land-groove recording system is adopted, it is desirable that the polarization direction of the incoming laser is perpendicular to the groove, because the recording characteristics of the land and the groove are readily matched with each other, and it is desirable that the groove depth is $\lambda/(7n)$ to $\lambda/(5n)$ in view of the crosstalk with the adjoining track. Further, in the case of the on-groove recording (recording on the convex portion as viewed from the light-incoming side), it is desirable that the polarization direction of the incoming laser is parallel to the groove, because the recording power margin is wide, and the tracking signal is sufficiently obtained. If the groove depth is deeper than $\lambda/(8n)$, the signal intensity is lowered. If the groove depth is shallower than $\lambda/(16n)$, it is impossible to obtain any sufficient tracking signal. Therefore, it is desirable that the groove depth is $\lambda/(8n)$ to $\lambda/(16n)$. In this case, $\lambda$ represents the wavelength of the laser for reproduction, and n represents the refractive index of the protective film, i.e., the ultraviolet-curable resin.

Ninth Embodiment

Figure 22:
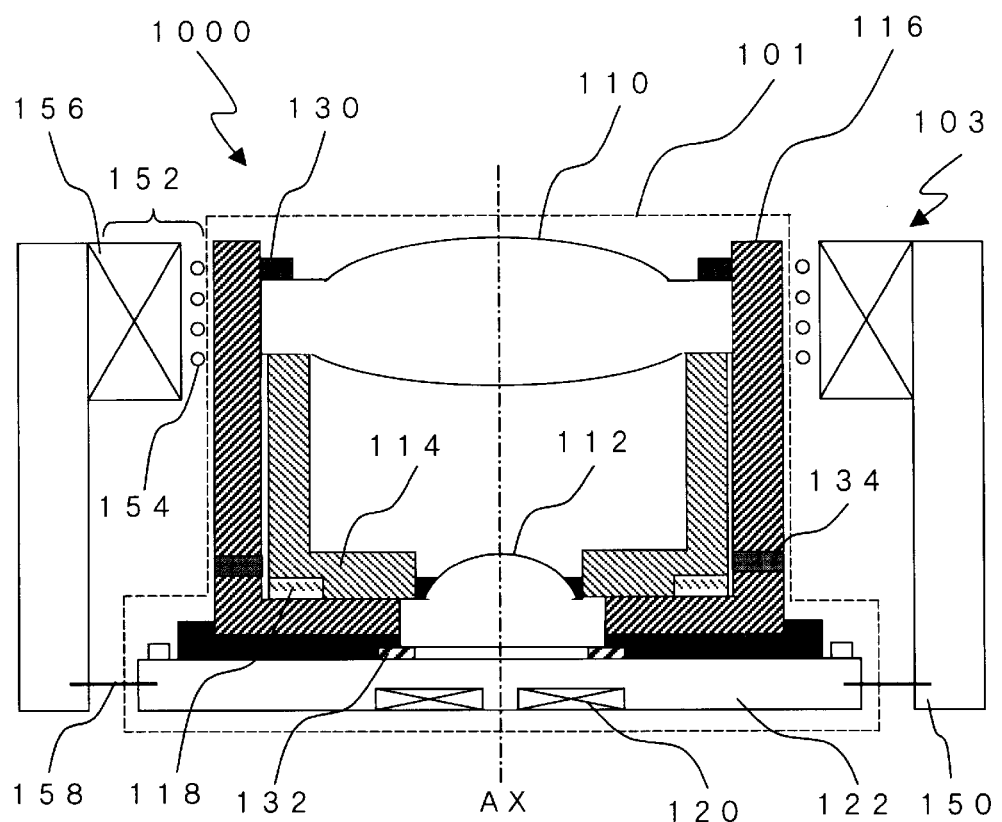
FIG. 22 shows a schematic structure of a magneto-optical head (pickup unit) in a ninth embodiment.

A structure of a pickup unit 1000 according to this embodiment will be explained with reference to FIG. 22. As shown in FIG. 22, the pickup unit 1000 of this embodiment comprises a main pickup body 101 and a pickup support section 103 which surrounds the main pickup body 101.

The main pickup body 101 principally comprises a first lens 110 for collecting the light beam from an external optical system as described later on, a second lens 112 for further minutely decreasing the spot diameter of the light beam collected by the first lens 110, a lens holder 114 for fixing the first lens 110, a lens holder 116 for fixing the second lens 112, piezoelectric actuators 118 for adjusting the optical axes of the first lens 110 and the second lens 112, a magnetic coil 120 to be used for performing the magneto-optical recording on a magneto-optical disk, and a coil support substrate 122 for supporting the magnetic coil 120 on the side of the magneto-optical disk.

As shown in FIG. 22, the second lens 112 is arranged on the coil support substrate 122. The first lens 110 is arranged so that the first lens 110 is positioned just over the second lens 112. The first lens 110 has flat surfaces at outer circumferential portions, and it is a convex lens in which both surfaces form convex spherical surfaces. The second lens 112 has flat surfaces at outer circumferential portions for being fixed to the holder, and it is a lens in which the upper surface forms a convex spherical surface and the lower surface forms a flat surface. The light beam from the external optical system is collected by the first lens 110 onto the second lens 112. The collected light beam is further collected by the second lens 112 so that a predetermined spot diameter is obtained on the magneto-optical disk. The lens holder 114 is cylindrical, and it has its bottom surface. The first lens 110 is fixed on an upper frame of the lens holder 114. An aperture for introducing the light beam into the second lens 112 is provided at a central portion of the bottom surface of the lens holder 114. The lens holder 116 is cylindrical, and it has its bottom surface. An aperture, which has the same diameter as that of the second lens 112, is provided at a central portion of the bottom surface in order to fix the second lens 112.

Figure 23:
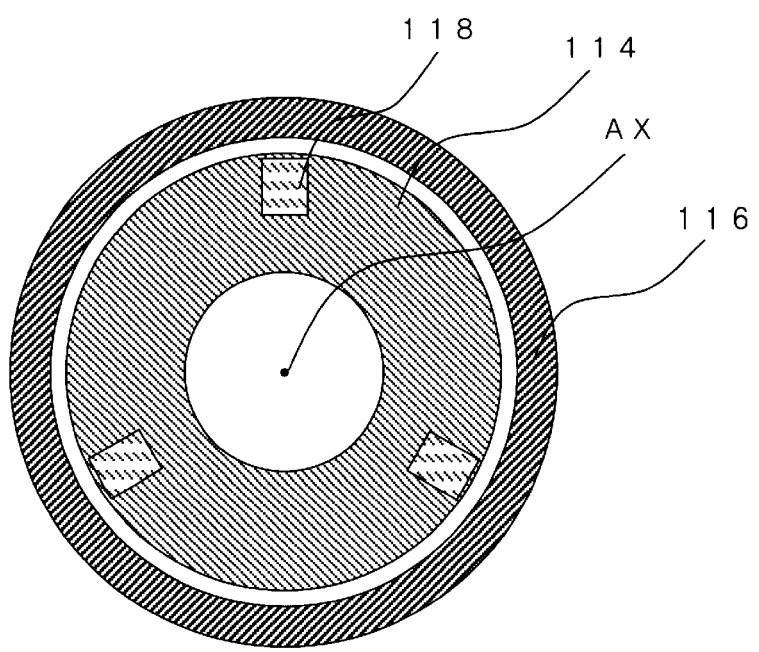
FIG. 23 shows a sectional view obtained by cutting the magneto-optical head shown in FIG. 22 along a plane perpendicular to the optical axis AX, illustrating an arrangement of piezoelectric actuators.

The lens holder 114 fixed with the first lens 110 is arranged at the inside of the lens holder 116 so that the gap is about 100 μm. The piezoelectric actuators 118 are embedded in outer circumferential portions of the bottom surface of the lens holder 114. Three of the piezoelectric actuators 118 are installed at intervals of 120° in the circumferential direction respectively (FIG. 23). The piezoelectric actuators 118 are installed on the inner wall of the bottom surface of the lens holder 116 respectively to support the lens holder 114 on the lens holder 116 so that the lens holder 114 is horizontally movable. Any discrepancy between the optical axes of the first lens 110 and the second lens 112 can be corrected by displacing the lens holder 114 in the horizontal direction with respect to the lens holder 116 and adjusting the optical axis of the first lens 110 to the optical axis AX of the second lens 112. Accordingly, the wave front aberration, which would be otherwise caused by the discrepancy between the optical axes of the two lenses, can be minimized. In this embodiment, a piezo-actuator was used as the piezoelectric actuator 118. The piezoelectric actuators 118 were wired as follows. That is, twisted pair wires were allowed to pass through holes machined through the side wall or the bottom surface of the lens holder 116, and they were fixed to the respective piezoelectric actuators 118 by means of soldering.

The pickup support section 103 comprises a main pickup support body 150, a focusing actuator 152, and an elastic member 158 for movably supporting the main pickup body 101 on the pickup support section 103. The focusing actuator 152 is provided at an upper portion of the main pickup support body 150 between the main pickup support body 150 and the main pickup body 101. In this embodiment, the focusing actuator 152 includes an actuator coil 154 attached to an upper portion of the outer circumferential wall of the lens holder 116 of the main pickup body 101, and a permanent magnet 156 for the actuator. The main pickup body 101 is supported by the main pickup support body 150 by the aid of the elastic member 158 such as a plate spring. Therefore, the main pickup body 101 is displaceable in the vertical direction by the aid of the focusing actuator 152. Accordingly, the displacement of the main pickup body 101 is finely adjustable in the vertical direction in the pickup unit 1000. Therefore, the focus is also finely adjustable with respect to the magneto-optical disk.

Figure 24:
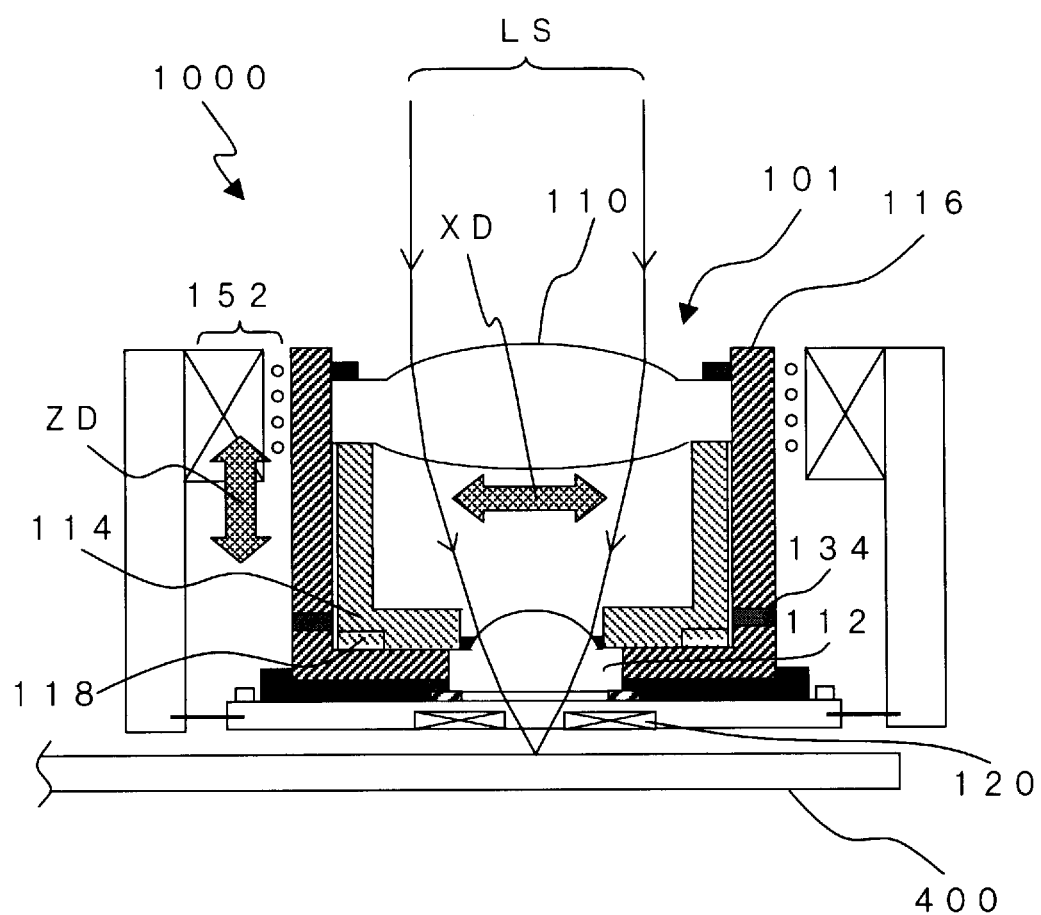
FIG. 24 conceptually illustrates the adjustment for the correction of the optical axis for the pickup in the ninth embodiment.

A method for correcting the optical axis of the pickup unit 1000 used in this embodiment will be explained below with reference to FIG. 24. In this case, the discrepancy of the optical axis is corrected by adjusting the focusing actuator 152 and the piezoelectric actuators 118 by using the magneto-optical disk 400. The magneto-optical disk 400 is formed so that the tracking may be effected for the upper surface, ranging from the diameter of a degree of the laser spot size determined by NA of the lens and the wavelength of the laser to be used, to the elliptic pit having the diameter of about ten times the above (linear direction). The laser beam LS is collected onto the magneto-optical disk 400 by using the pickup unit 100, while rotating the magneto-optical disk 400 at a predetermined number of revolutions and displacing the main pickup body 101 in the vertical direction (as indicated by the arrow ZD in FIG. 24) by using the focusing actuator 152. The light beam, which is reflected from the pit, is transmitted through the second lens 112 and the first lens 110, and it is subjected to reproduction by a magneto-optical signal detector of the external optical system as described later on. In this process, the best focus position is determined from the displaced position of the main pickup body 101 and the intensity of the reproduced signal.

Subsequently, the driving voltage is applied to the piezoelectric actuators 118 to displace the lens holder 114 in the horizontal direction (as indicated by the arrow ZD in FIG. 24) with respect to the lens holder 116 so that the output is large especially from the pit having the small size (minimum pit) and the resolution (=reproduced signal from the minimum pit/reproduced signal from the maximum pit) is large, while dealing with the reproduced signals obtained from the pits having a variety of sizes. It is considered that the optical axis of the first lens 110 is approximately coincident with the optical axis AX of the second lens 112 at the position at which both of the signal from the minimum pit and the resolution are approximately maximum. In this situation, the magneto-optical disk 400 is detached. In order to fix the relative positions of the first lens 110 and the second lens 112, the twisted pair wires, with which the driving voltage is supplied to the piezoelectric actuators 118, are removed, and an epoxy adhesive is poured through the holes 134 for allowing the twisted pair wires to pass therethrough. Accordingly, the lens holders 114, 116 are fixed. The adjustment as described above can be also performed when the magneto-optical disk 400 is subjected to loading in the drive. In this case, the pit area for correcting the discrepancy of the optical axis is previously formed on the disk, and the reproduced signal from this area is utilized to adjust the optical axis.

Figure 25:
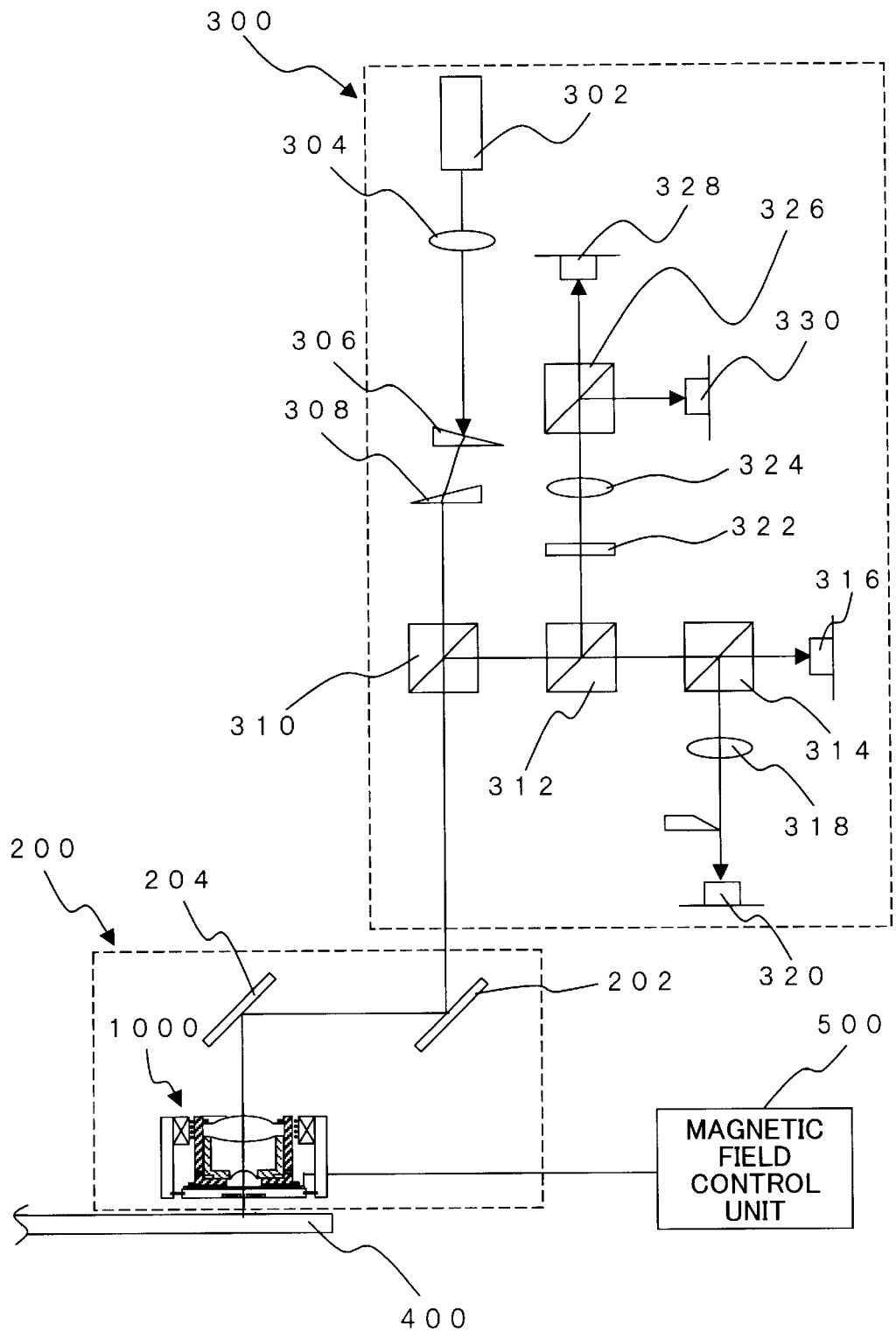
FIG. 25 schematically shows an optical system of a magneto-optical recording apparatus based on the use of the pickup of the ninth embodiment.

FIG. 25 shows a specified embodiment of the entire optical system of the magneto-optical recording apparatus incorporated with the pickup unit 1000 according to the present invention. As shown in FIG. 25, the embodiment of the present invention comprises a movable optical system 200 including the pickup unit 1000, a fixed optical system 300, a magneto-optical disk 400, and a magnetic field control unit 500. In FIG. 25, an optical system, which is equivalent to a drive for performing recording or reproduction on an ordinary magneto-optical disk, can be used for the fixed optical system 300. That is, the laser beam, which is radiated from a laser light source 302 such as a semiconductor laser, passes through a lens 304, prisms 306, 308, and a beam splitter 310, and it is reflected by mirrors 202, 204. After that, the laser beam comes into the first lens 110 of the pickup unit 1000, and it is collected by the second lens 112. The laser beam is focused on the recording layer of the magneto-optical disk 400. In this situation, a current corresponding to a recording signal is supplied from the magnetic field control unit 500 to the magnetic coil 120 in the pickup unit 1000. Accordingly, a recording magnetic field is generated from the magnetic coil 120. Thus, a recording mark, which corresponds to the recording signal, is formed in the recording layer in accordance with the magnetic field modulation system. The recording system is not limited to the magnetic field modulation system. Recording can be also performed in accordance with the optical modulation system or the light pulse magnetic field modulation system.

Upon the reproduction, the reflected light beam from the magneto-optical disk 400 is reflected by the mirrors 202, 204, and then it is reflected by the beam splitter 310. The reflected light beam is divided by a beam splitter 312 into light beams directed toward two beam splitters 314, 326. The reflected light beam, which comes into the beam splitter 314, is further divided thereby into those coming into a focusing-detecting detector 320 and a tracking signal-detecting detector 316 respectively. The reflected light beam, which comes into a beam splitter 326 after passing through a ½ wavelength plate 322 and a lens 324, comes into photodetectors 328, 330 for detecting light beams of polarized components which are orthogonal to one another to detect the reproduced signal corresponding to the Kerr rotation angle.

The magneto-optical head and the magneto-optical recording apparatus of the present invention have been specifically explained above in accordance with the embodiments. However, the present invention is not limited to the embodiments, which may include a variety of modified embodiments and improved embodiments that can be conceived from claims of the present invention by those skilled in the art. For example, a variety of lenses can be used for the objective lens system carried on the magneto-optical head. A solid immersion lens, which makes it possible to perform the near field recording, may be used as the lens on the disk side. A variety of shapes, dimensions, and materials may be adopted for the magnetic coil and the substrate. In the second embodiment, the space between the light-outgoing plane 2a of the lens 2 and the upper surface 3b of the substrate is filled with the adhesive. Alternatively, the space between the light-outgoing plane 2a of the lens 2 and the upper surface 3b of the substrate may be filled with an oil for matching the refractive index in order to further avoid the refraction at the interface between the lens 2 and the adhesive or the refraction at the interface between the adhesive and the substrate 3. It is possible to use the oil having the refractive index which is approximately the same as the refractive indexes of the materials for constructing the lens and the substrate.

In the first to eighth embodiments described above, the through-hole 11 is formed by using the excimer laser. Alternatively, the through-hole 11 may be formed by means of the sand blasting based on the use of a mask in place of the excimer laser. In view of the cost and the mass-productivity, the through-hole 11 may not be formed. In this case, the wiring may be formed up to the end of the coil, and a wiring pattern may be formed on the side surface of the substrate after producing the coil.

In the magneto-optical head according to the first aspect of the present invention, the heat-releasing member is provided on the surface of the magnetic coil substrate provided with the magnetic coil, i.e., on the side opposed to the magneto-optical disk. Therefore, the heat generated by the magnetic coil can be effectively released to the space between the magneto-optical disk and the magnetic coil. Especially, the magnetic coil can be effectively cooled by utilizing the air stream generated by the rotating movement of the magneto-optical disk. Especially, even when a high frequency signal is recorded, the magnetic characteristics of the magnetic coil are not inhibited. Further, the tracking is performed in a well-suited manner. Therefore, the magneto-optical head of the present invention and the magneto-optical recording apparatus which carries the same are extremely useful for the high density recording. Further, the production process is simple for the magneto-optical head of the present invention and the magneto-optical recording apparatus which carries the same, and thus they can be produced at low cost.

In the magneto-optical head according to the third aspect of the present invention, the actuator is provided to relatively move the first lens holder in the direction perpendicular to the optical axis of the lens with respect to the second lens holder. Therefore, it is possible to correctly adjust the optical axes of the first lens and the second lens. Accordingly, even when the lens having high NA is used for the second lens, it is possible to avoid any occurrence of the wave front aberration. Therefore, the magneto-optical head of the present invention and the magneto-optical recording apparatus which carries the same are extremely useful for the high density recording.

What is claimed is:

1. A magneto-optical head to be used for recording information on an information-recording medium, comprising:

a lens which collects a light beam onto the information-recording medium;

a substrate which has a first surface and a second surface parallel to one another and which supports the lens on the first surface;

a magnetic coil which is provided on the second surface of the substrate; and a heat-releasing member which is provided on the second surface of the substrate and which releases heat generated by the magnetic coil, wherein the heat-releasing member is provided at the outside of the circumference of the magnetic coil.

2. The magneto-optical head according to claim 1, wherein the heat-releasing member is provided at a position which is nearer to the information-recording medium as compared with the magnetic coil in an optical axis direction of the lens.

3. The magneto-optical head according to claim 1, wherein the substrate is a glass flat plate.

4. The magneto-optical head according to claim 1, further comprising a support pad which supports the lens, the support pad being provided on the first surface of the substrate.

5. The magneto-optical head according to claim 1, wherein a projection which protects the magnetic coil is formed on the second surface of the substrate.

6. The magneto-optical head according to claim 5, wherein a protective film is formed on a surface of the projection.

7. The magneto-optical head according to claim 1, further comprising a protective pad which is formed on the second surface of the substrate.

8. The magneto-optical head according to claim 7, wherein the protective pad is made of resin.

9. The magneto-optical head according to claim 1, wherein the substrate is larger than the lens in a direction along a surface of the substrate.

10. The magneto-optical head according to claim 1, wherein the coil is stacked in two or more layers.

11. The magneto-optical head according to claim 1, wherein a first soft magnetic layer, which is formed with an aperture for transmitting the light beam, is provided between the coil and the second surface of the substrate.

12. The magneto-optical head according to claim 11, wherein a second soft magnetic layer, which is formed with an aperture for transmitting the light beam, is further provided on a side of the information-recording medium of the coil.

13. The magneto-optical head according to claim 12, wherein an areal size of the aperture of the second soft magnetic layer for transmitting the light beam is larger than an areal size of the aperture of the first soft magnetic layer for transmitting the light beam.

14. A magneto-optical recording apparatus for recording information on an information-recording medium, comprising:

a light source;

a magneto-optical head with which a light beam from the light source is radiated onto the information-recording medium to record the information; and a detecting system which detects the light beam returning from the information-recording medium, wherein the magneto-optical head comprises:

a lens which collects the light beam onto the information-recording medium;

a substrate which has a first surface and a second surface parallel to one another and which supports the lens on the first surface;

a magnetic coil which is provided on the second surface of the substrate; and a heat-releasing member which is provided on the second surface of the substrate and which releases heat generated by the magnetic coil, wherein the heat-releasing member is provided at the outside of the circumference of the magnetic coil.

15. The magneto-optical recording apparatus according to claim 14, wherein the heat-releasing member is provided at a position which is nearer to the information-recording medium as compared with the magnetic coil in an optical axis direction of the lens.

16. The magneto-optical recording apparatus according to claim 14, further comprising a support pad which supports the lens, the support pad being provided on the first surface of the substrate.

17. The magneto-optical recording apparatus according to claim 14, wherein a projection is formed on the second surface of the substrate.

18. The magneto-optical recording apparatus according to claim 14, further comprising a protective pad which is formed on the second surface of the substrate.

19. The magneto-optical recording apparatus according to claim 14, wherein the information-recording medium is rotated and moved at a velocity of not less than 1.0 respect to the magneto-optical head.

20. The magneto-optical recording apparatus according to claim 14, wherein NA of the lens is not less than 0.6.

21. A magneto-optical head to be used for recording information on an information-recording medium, comprising:

a first lens and a second lens which collect a light beam onto the information-recording medium;

a first lens holder which holds the first lens;

a second lens holder which holds the second lens;

a first actuator which is provided between the first lens holder and the second lens holder and which relatively moves the first lens holder with respect to the second lens holder in a direction perpendicular to an optical axis of the first lens;

a substrate which has a first surface and a second surface, the first lens holder and the second lens holder being arranged on the first surface;

a magnetic coil which is provided on the second surface of the substrate; and a heat-releasing member which is provided on the second surface of the substrate and which releases heat generated by the magnetic coil, wherein the heat-releasing member is provided at the outside of the circumference of the magnetic coil.

22. The magneto-optical head according to claim 21, further comprising a second actuator which relatively moves the first lens holder with respect to the second lens holder in a direction of the optical axis.

23. The magneto-optical head according to claim 21, further comprising a protective pad which is formed on the second surface of the substrate.

24. The magneto-optical head according to claim 23, wherein the protective pad covers at least four corners of the second surface of the substrate.

25. The magneto-optical head according to claim 23, wherein the protective pad is made of resin.

26. A magneto-optical recording apparatus for recording information on an information-recording medium, comprising:

a light source;

a magneto-optical head with which a light beam from the light source is radiated onto the information-recording medium to record the information; and a detecting system which detects the light beam returning from the information-recording medium, wherein the magneto-optical head comprises:

a first lens and a second lens which collect the light beam onto the information-recording medium;

a first lens holder which holds the first lens;

a second lens holder which holds the second lens;

a first actuator which is provided between the first lens holder and the second lens holder and which relatively moves the first lens holder with respect to the second lens holder in a direction perpendicular to an optical axis of the first lens;

a substrate which has a first surface and a second surface and which supports the first lens holder and the second lens holder on the first surface;

a magnetic coil which is provided on the second surface of the substrate; and a heat-releasing member which is provided on the second surface of the substrate and which releases heat generated by the magnetic coil, wherein the heat-releasing member is provided at the outside of the circumference of the magnetic coil.

27. The magneto-optical recording apparatus according to claim 26, further comprising a second actuator which relatively moves the first lens holder with respect to the lens holder in a direction of the optical axis.

28. The magneto-optical recording apparatus according to claim 26, further comprising a protective pad which is provided on the second surface of the substrate.

29. The magneto-optical recording apparatus according to claim 28, wherein the protective pad covers at least four corners of the second surface of the substrate.

30. The magneto-optical recording apparatus according to claim 28, wherein the protective pad is made of resin.

* * * * *